US012713128B2

(12) United States Patent
Feng et al.

(10) Patent No.: US 12,713,128 B2
(45) Date of Patent: Aug. 18, 2026

(54) SYSTEMS AND METHODS OF ADAPTIVE PHASE DETECTION AUTOFOCUS OFFSET CORRECTION

(71) Applicant: QUALCOMM Incorporated, San Diego, CA (US)

(72) Inventors: Wen-Chun Feng, New Taipei City (TW); Hsuan-Ming Liu, New Taipei City (TW); Mian Li, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 18/729,665

(22) PCT Filed: Mar. 24, 2022

(86) PCT No.: PCT/CN2022/082887

§ 371 (c)(1),
(2) Date: Jul. 17, 2024

(87) PCT Pub. No.: WO2023/178626

PCT Pub. Date: Sep. 28, 2023

(65) Prior Publication Data

US 2025/0097575 A1 Mar. 20, 2025

(51) Int. Cl.
*H04N 23/67* (2023.01)
*H04N 25/704* (2023.01)

(52) U.S. Cl.
CPC ......... *H04N 23/672* (2023.01); *H04N 23/675* (2023.01); *H04N 25/704* (2023.01)

(58) Field of Classification Search
CPC .. H04N 23/672; H04N 23/675; H04N 25/704; H04N 23/673
See application file for complete search history.

(56) References Cited

U.S. PATENT DOCUMENTS

2009/0015703 A1* 1/2009 Kim ..................... H04N 23/631 348/333.12
2016/0373643 A1* 12/2016 Abe ..................... H04N 23/672
(Continued)

FOREIGN PATENT DOCUMENTS

CN 106549025 A 3/2017
WO 2016140066 A1 9/2016
WO 2018044314 A1 3/2018

OTHER PUBLICATIONS

International Search Report and Written Opinion—PCT/CN2022/082887—ISA/EPO—Dec. 13, 2022.

*Primary Examiner* — Jason A Flohre
(74) *Attorney, Agent, or Firm* — QUALCOMM Incorporated

(57) ABSTRACT

Imaging systems and techniques are described. An imaging system receives image data captured by an image sensor according to one or more image capture settings, for instance according to an aperture size, temperature, lux, lens position, and/or region of interest. The image data includes image pixel data and focus pixel data. The imaging system determines a first focus setting based on phase detection using the focus pixel data. The imaging system determines a focus offset based on use of the one or more image capture settings as inputs to a trained model (e.g., decision tree, random forest, neural network). The imaging system determines a second focus setting at least in part by adjusting the first focus setting according to the focus offset, and causes a focus control mechanism to set a focus parameter to the second focus setting.

30 Claims, 16 Drawing Sheets

(56) References Cited

U.S. PATENT DOCUMENTS

| | | | | |
|---|---|---|---|---|
| 2018/0349378 | A1* | 12/2018 | Galor Gluskin | G03B 13/36 |
| 2019/0089892 | A1* | 3/2019 | Kurisu | G02B 7/346 |
| 2019/0222759 | A1* | 7/2019 | Feng | H04N 23/681 |
| 2019/0387175 | A1* | 12/2019 | Kikuchi | H04N 23/959 |
| 2020/0260014 | A1* | 8/2020 | Miyatani | G06N 3/0464 |
| 2020/0296296 | A1* | 9/2020 | Chino | G03B 3/02 |
| 2020/0412969 | A1* | 12/2020 | Shimizu | H04N 23/672 |
| 2021/0074016 | A1* | 3/2021 | Li | G06T 7/73 |
| 2022/0028116 | A1 | 1/2022 | Sieckmann et al. | |
| 2022/0174207 | A1* | 6/2022 | Shigeta | H04N 23/67 |
| 2022/0311940 | A1* | 9/2022 | Jung | H04N 23/45 |
| 2023/0055269 | A1* | 2/2023 | Sato | H04N 23/675 |

* cited by examiner

700A
| Lux 705 | Lens Position 710 after CDAF | PD Value 715 at Lens Position 710 | Defocus Value 720 at Lens Position 710 |
|---|---|---|---|
| 1000 | 654 | -0.51 | -88.51 |
| 100 | 646 | -0.42 | -73.2 |
| 20 | 618 | 0.02 | 2.33 |
FIG. 7A
700B
| | | | | | | | |
|---|---|---|---|---|---|---|---|
| -11 | -6 | -28 | -20 | -53 | 0 | -40 | -2 |
| -9 | -13 | -20 | -13 | -68 | -3 | -18 | -21 |
| -5 | -10 | -16 | -8 | -43 | -17 | 0 | -25 |
| -11 | -5 | +4 | -14 | -39 | -4 | -6 | -65 |
| -19 | -6 | -5 | -26 | -68 | -16 | +5 | -31 |
| +1 | -17 | -20 | -3 | -44 | -50 | +29 | -4 |
FIG. 7B
700C
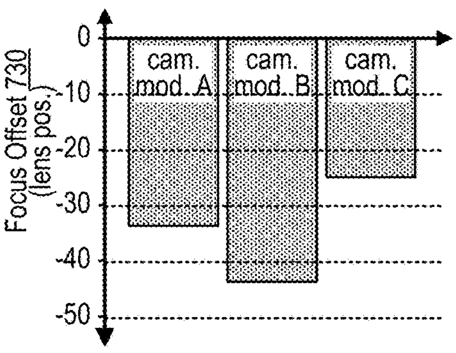
FIG. 7C
700D
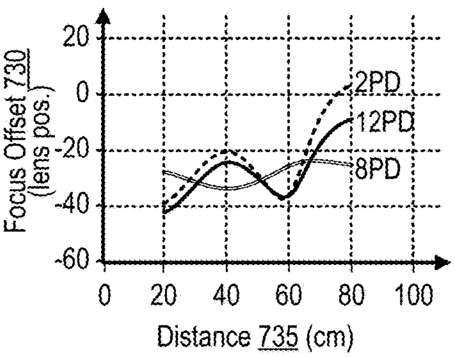
FIG. 7D PDAF Trigger 1005

Query 1010

Data Store 1015

Focus Offset Map 1020

Determination 1025: Valid ROI?

NO

YES

PDAF Search 1030 with standardized focus offset 1035

PDAF Search 1030 with adaptive focus offset 1040

Determination 1045: Need sample(s)?

YES

NO

CDAF Search(es) 1050

New Focus Offset Sample(s) 1055

SYSTEMS AND METHODS OF ADAPTIVE PHASE DETECTION AUTOFOCUS OFFSET CORRECTION

CROSS-REFERENCE TO RELATED APPLICATIONS

This application for Patent is a 371 of international Patent Application PCT/CN2022/082887, filed Mar. 24, 2022, which is hereby incorporated by referenced in its entirety and for all purposes.

FIELD

This application is related to image capture and processing. More specifically, this application relates to systems and methods of automatically determining a focus offset between a focus setting determined using phase detection autofocus (PDAF) and an optimal focus setting, and automatically using the focus offset to improve focus settings determined using PDAF.

BACKGROUND

Cameras are devices that capture images of a scene when light from the scene reaches an image sensor of the camera. Cameras generally include one or more lenses through which light travels before the light reaches the image sensor of the camera to capture the image. These lenses bend light that they receive from the scene to focus the light onto the image sensor. If the light is focused precisely on the image sensor, the scene appears sharp and in focus in the captured image. If the light is not focused precisely on the image sensor, the scene appears blurry and out of focus in the captured image.

Adjusting the focus of a camera is generally achieved by moving a lens of the camera either closer to or farther from the image sensor. In some cameras, focus is adjusted manually by the photographer, for instance via a dial along the camera that the photographer rotates clockwise or counterclockwise to move the lens forward or backward, respectively.

BRIEF SUMMARY

In some examples, systems and techniques are described for image processing. An imaging system receives image data captured by an image sensor according to one or more image capture settings, for instance according to an aperture size, temperature, lux, lens position, and/or region of interest. The image data includes image pixel data (e.g., from image pixels of the image sensor) and focus pixel data (e.g., from focus pixels of the image sensor). The imaging system determines a first focus setting based on phase detection using the focus pixel data. The imaging system determines a focus offset based on use of the one or more image capture settings as inputs to a trained model (e.g., decision tree, random forest, neural network). The imaging system determines a second focus setting at least in part by adjusting the first focus setting according to the focus offset, and causes a focus control mechanism to set a focus parameter to the second focus setting.

In one example, an apparatus for imaging is provided. The apparatus includes a memory and one or more processors (e.g., implemented in circuitry) coupled to the memory. The one or more processors are configured to and can: receive image data captured by an image sensor according to one or more image capture settings, wherein the image data includes focus pixel data; determine a first focus setting based on phase detection using the focus pixel data; determine a second focus setting at least in part by adjusting the first focus setting according to a focus offset that is based on the one or more image capture settings; and cause a focus control mechanism to set a focus parameter to the second focus setting.

In another example, a method of imaging is provided. The method includes: receiving image data captured by an image sensor according to one or more image capture settings, wherein the image data includes focus pixel data; determining a first focus setting based on phase detection using the focus pixel data; determining a second focus setting at least in part by adjusting the first focus setting according to a focus offset that is based on the one or more image capture settings; and causing a focus control mechanism to set a focus parameter to the second focus setting.

In another example, a non-transitory computer-readable medium is provided that has stored thereon instructions that, when executed by one or more processors, cause the one or more processors to: receive image data captured by an image sensor according to one or more image capture settings, wherein the image data includes focus pixel data; determine a first focus setting based on phase detection using the focus pixel data; determine a second focus setting at least in part by adjusting the first focus setting according to a focus offset that is based on the one or more image capture settings; and cause a focus control mechanism to set a focus parameter to the second focus setting.

In another example, an apparatus for image processing is provided. The apparatus includes: means for receiving image data captured by an image sensor according to one or more image capture settings, wherein the image data includes focus pixel data; means for determining a first focus setting based on phase detection using the focus pixel data; means for determining a second focus setting at least in part by adjusting the first focus setting according to a focus offset that is based on the one or more image capture settings; and means for causing a focus control mechanism to set a focus parameter to the second focus setting.

In some aspects, one or more of the methods, apparatuses, and computer-readable medium described above further comprise: determining the focus offset based on use of the one or more image capture settings as inputs to a trained model. In some aspects, the trained model includes focus offset maps that include respective focus offsets corresponding to different regions of interest to focus on. In some aspects, the trained model includes a linear regression. In some aspects, the trained model includes a decision tree. In some aspects, one or more of the methods, apparatuses, and computer-readable medium described above further comprise: periodically retraining the trained model according to a schedule.

In some aspects, the trained model is trained using training data that indicates one or more respective differences between one or more phase detection autofocus (PDAF) focus settings that are determined using PDAF and one or more corresponding contrast detection autofocus (CDAF) focus settings that are determined using CDAF with the one or more PDAF focus settings as respective starting points. In some aspects, the trained model is trained using training data that is generated based on prior focus settings for the focus control mechanism that are determined based on prior image capture settings for image capture using the image sensor.

In some aspects, determining the first focus setting based on phase detection using the focus pixel data includes identifying a phase difference between a first focus dataset of the focus pixel data and a second focus dataset of the focus pixel data, wherein the first focus dataset is associated with a first focus pixel of the image sensor, wherein the second focus dataset is associated with a second focus pixel of the image sensor.

In some aspects, the one or more image capture settings include a third focus setting that is distinct from the second focus setting, wherein causing the focus control mechanism to set the focus parameter to the second focus setting includes causing the focus control mechanism to adjust the focus parameter from the third focus setting to the second focus setting. In some aspects, causing the focus control mechanism to set the focus parameter to the second focus setting includes causing actuation of a linear actuator of the focus control mechanism to move a lens from a first lens position to a second lens position that corresponds to the second focus setting, wherein the image data is captured based on light passing through the lens and reaching the image sensor. In some aspects, causing the focus control mechanism to set the focus parameter to the second focus setting includes causing actuation of a linear actuator of the focus control mechanism to move a lens in a direction that is perpendicular to an image plane of the image sensor.

In some aspects, the one or more image capture settings include at least one of aperture size, temperature, lux, lens position, or region of interest.

In some aspects, one or more of the methods, apparatuses, and computer-readable medium described above further comprise: receiving secondary image data captured by the image sensor according to the second focus setting; and outputting the secondary image data. In some aspects, one or more of the methods, apparatuses, and computer-readable medium described above further comprise: a display interface, wherein, to output the secondary image data, the one or more processors are configured to cause the secondary image data to be displayed using a display at least in part by sending the secondary image data to the display through the display interface. In some aspects, one or more of the methods, apparatuses, and computer-readable medium described above further comprise: a communication interface, wherein, to output the secondary image data, the one or more processors are configured to send the secondary image data to a recipient device using the communication interface.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 3B is a conceptual diagram illustrating a side view of a focus pixel arrangement with a microlens covering two phase detection (PD) photodiodes, in accordance with some examples;

FIG. 7A is a table indicating how different values for lux result in differences in in phase detection values and defocus values at a lens position reached via contrast detection autofocus (CDAF), in accordance with some examples;

FIG. 7B is a focus offset map indicating examples of different focus offset values at different regions of interest (ROI) along an image frame, in accordance with some examples;

FIG. 7C is a graph indicating examples of different focus offset values for different camera modules, in accordance with some examples;

FIG. 7D is a graph indicating examples of different focus offset values for different distances, in accordance with some examples;

DETAILED DESCRIPTION

Figure 1:
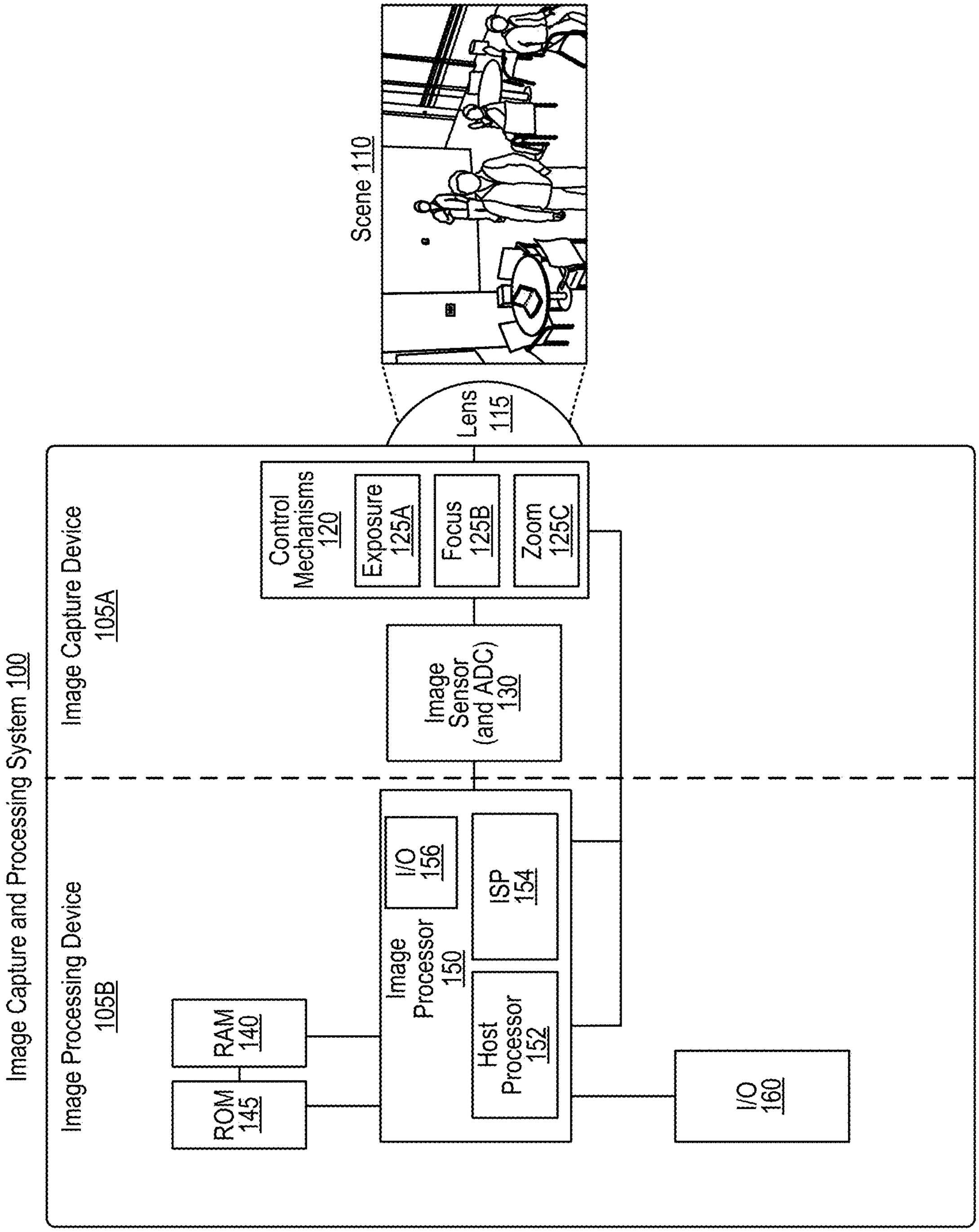
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms “image,” “image frame,” and “frame” are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Adjusting the focus of a camera is generally achieved by moving a lens of the camera either closer to or farther from the image sensor. In some cameras, focus is adjusted manually by the photographer, for instance via a dial along the camera that the photographer rotates clockwise or counter-clockwise to move the lens forward or backward, respectively, or vice versa. Some cameras may include automatic focus systems, also referred to as autofocus systems. Autofocus systems automatically determine an appropriate focus setting, can include active autofocus systems and passive autofocus systems.

Active autofocus systems determine a focus setting based on a range between the camera and a subject of the image via a range sensor of the camera, typically determined by the camera by emitting infrared lasers or ultrasound signals and receiving reflections of those signals. While active AF works well in many cases and can be fairly quick, cameras with active AF can be bulky and expensive. Active AF can fail to properly focus on subjects that are very close to the camera lens (macro photography), as the range sensor is not perfectly aligned with the camera lens, and this difference is exacerbated the closer the subject is to the camera lens. Active AF can also fail to properly focus on faraway subjects, as laser or ultrasound transmitters used in the range sensors that are used for active AF are typically not very strong. Active AF also often fails to properly focus on subjects on the other side of a window (or other transparent or translucent surface) than the camera, as the range sensor typically determines the range to the window rather than to the subject. Active AF generally requires extrinsic calibration between the range sensor and camera upon manufacturing the camera to account for minor variations in production and design. This extrinsic calibration can become inaccurate over time due to wear and tear, potentially reducing the accuracy of the Active AF over time.

Passive autofocus systems determine a focus setting using the camera’s own image sensor, and thus generally do not require additional sensors. Passive autofocus systems can include phase detection autofocus (PDAF) systems, contrast detection autofocus (CDAF) systems, or combinations thereof.

In CDAF systems, the lens of a camera moves step-wise through a range of lens positions, with pre-specified distance intervals between each respective tested lens position, and attempts to find a lens position at which contrast between the subject’s pixels and background pixels are maximized. CDAF relies on trial and error, and has high latency as a result. The CDAF process also requires the motor that moves the lens to be actuated and stopped repeatedly in a short span of time every time the camera needs to focus for a photo, which puts stress on components and expends a considerable amount of power (e.g., reducing battery life and in some cases requiring additional components for heat dissipation). The camera can still fail to find a satisfactory focus using CDAF, for example if the camera finds a local maximum in contrast that is not the true maximum in contrast, or if the true maximum falls in between tested lens positions (e.g., between steps in the stepwise testing process).

In PDAF systems, the image sensor includes focus pixels that are specially configured (e.g., using masks covering part of the photodiode and/or specialized microlenses that cover multiple photodiodes) to receive light from specific angles without receiving light from other angles. These focus pixels of the image sensor are used to check whether light that is received by the lens of a camera from different angles converges to create a focused (clear) image that is in phase, and therefore in focus, or fails to converge and to create an unfocused (blurry) image that is out of phase. If light received from different angles is out of phase, a PDAF system can identify a direction in which the light is out of phase to determine whether the lens needs to be moved forward or backward, and can identify a phase disparity indicating how out of phase the light is to determine how far the lens is to be moved to be in phase. The PDAF system can then move the lens to the optimal position after a single round of PDAF (or, in some examples, a few rounds of PDAF), thus not relying on trial and error the way that CDAF systems do. Generally, PDAF is faster than CDAF, PDAF uses less power than CDAF, and PDAF results in less wear on components than CDAF.

In some cases, a hybrid autofocus system may use both PDAF and CDAF to increase accuracy and to reduce some of the downsides of CDAF. For instance, a hybrid autofocus system can use PDAF to determine a PDAF-optimal lens position, and can move the lens from an original position to the PDAF-optimal lens position. The hybrid autofocus system can then use CDAF to test contrast at a number of lens positions within a range of the PDAF-optimal lens position, to ultimately determine a CDAF-optimal lens position. This approach may provide benefits in that the use of CDAF can help compensate for any slight errors or inaccuracies in the PDAF autofocus, generally resulting in a more accurate focus setting than in a system that only performs PDAF. Because the PDAF-optimal lens position is likely to already be close to the optimal lens position for focus, the breadth of the range of lens positions to be tested under CDAF can be reduced, speeding up the CDAF process, reducing power consumption for the CDAF process, and reducing wear on components produced by the CDAF process. However, this type of hybrid autofocus system is still slower than a system that only performs PDAF.

Systems and techniques are described for image capture and/or processing. In some examples, an imaging system described herein receives image data captured by an image sensor according to one or more image capture settings, for instance according to an aperture size, temperature, lux, lens position, and/or region of interest. The image data includes image pixel data (e.g., from image pixels of the image sensor) and focus pixel data (e.g., from focus pixels of the image sensor). The imaging system determines a first focus setting based on phase detection using the focus pixel data. For instance, the first focus setting may correspond to the PDAF-optimal lens position described above. The imaging system determines a focus offset based on use of the one or more image capture settings as inputs to a trained model (e.g., decision tree, random forest, neural network). The imaging system determines a second focus setting at least in part by adjusting the first focus setting according to the focus offset. For instance, the second focus setting can be an estimate of the CDAF-optimal lens position described above, estimated based on the focus offset determined using the trained model. In some examples, the trained model may be trained using training data that indicates one or more respective differences between one or more prior PDAF focus settings that are determined using PDAF and one or more corresponding prior CDAF focus settings that are determined using CDAF with the one or more prior PDAF focus settings as respective starting points. The imaging system causes a focus control mechanism to set a focus parameter to the second focus setting. For instance, the imaging system can actuate a linear actuator (e.g., a voice control motor) to move a lens corresponding to the image sensor from a first lens position to a second lens position that corresponds to the second focus setting. The lens can be a lens through which light passes before reaching the image sensor for capture of the image data.

The imaging systems and techniques described herein provide a number of technical improvements over other imaging systems and autofocus systems, such as active autofocus systems, PDAF-only systems, CDAF-only systems, and hybrid autofocus systems that use both PDAF and CDAF. For instance, the imaging systems and techniques described herein provide technical benefits similar to those of hybrid autofocus systems that use both PDAF and CDAF, such as increased accuracy in autofocus compared to PDAF-only systems. The imaging systems and techniques described herein also minimize or eliminate the downsides of hybrid autofocus systems that use both PDAF and CDAF by bypassing CDAF in favor of determining a focus offset using a trained model, for instance by speeding up the hybrid autofocus process, reducing power consumption for the hybrid autofocus process, and reducing wear on components produced by the hybrid autofocus process. The imaging systems and techniques described herein also provide benefits over CDAF-only systems, for instance by speeding up the hybrid autofocus process, reducing power consumption for the hybrid autofocus process, and reducing wear on components produced by the hybrid autofocus process. The imaging systems and techniques described herein also provide benefits over active autofocus, for instance by avoiding any need for additional sensors or reliance on extrinsic calibration between sensors that can become unreliable over time, providing accurate focus of subjects through windows (or other transparent or translucent surfaces), and providing accurate focus for macro photography.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene in a subject, such as the subject 205 of FIGS. 2A-2C. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing system 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1520, read-only memory (ROM) 145 and/or 1525, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
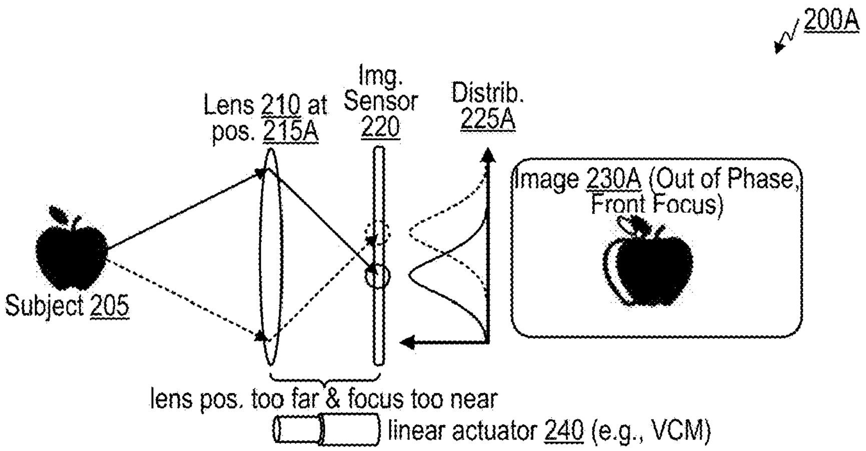
FIG. 2A is a conceptual diagram illustrating an image capture system that is out of phase with a front focus, in accordance with some examples.

FIG. 2A is a conceptual diagram 200A illustrating an image capture system that is out of phase with a front focus. Rays of light are illustrated traveling from a subject 205 (e.g., an apple) through a lens 210 that focuses a scene with the subject 205 onto an image sensor 220. The lens 210 is an example of the lens 115. The image sensor 220 is an example of the image sensor 130. The image sensor 220 includes focus pixels. The focus pixels may each include focus photodiode(s) (e.g., PD photodiode 320A, PD photodiode 320B, PD photodiode 320C), color filter(s) (e.g., color filter 310A, color filter 310B, color filter 310C) corresponding to the focus photodiode(s), microlens(es) (e.g., single-photodiode microlens 215, dual-photodiode microlens 360) corresponding to the focus photodiode(s), mask(s) (e.g., mask 325) corresponding to the focus photodiode(s), or a combination thereof. In some cases, the light rays may travel through the microlens(es) after passing through the lens 210 but before reaching on the focus photodiode(s) of the focus pixels of the image sensor 220. In some examples, one or more further lenses may be included between the lens 210 and the image sensor 220, such as lenses corresponding to an afocal zoom system.

The lens 210 is positioned at a lens position 215A using a linear actuator 240. The linear actuator 240 may be an example of the one or more focus control mechanisms 125B. In some examples, the linear actuator 240 may be a voice coil motor (VCM). With the lens 210 at the lens position 215A, the light rays from the subject 205 cross and diverge before reaching image sensor 220, and thus reach different points along the image sensor 220. The light from the subject 205 is thus out of phase, as indicated by the difference in the points at which the light rays reach the image sensor 220, and the corresponding graphed distributions 225A of light from the subject 205. With the lens 210 at the lens position 215A, an image 230A captured using the image sensor 220 is out of phase and out of focus, with a front focus. Because the image 230A is out of phase and out of focus, the image 230A appears blurry and not sharp or clear, as illustrated by the image 230A of the subject 205 (e.g., the apple) appearing to show the subject 205 with double-vision (e.g., illustrated to resemble diplopia or double-vision). The front focus indicates that the lens position 215A is too far from the image sensor 220, causing the focus to be too near to the image capture system (e.g., closer to the image capture system than the subject 205).

Figure 2B:
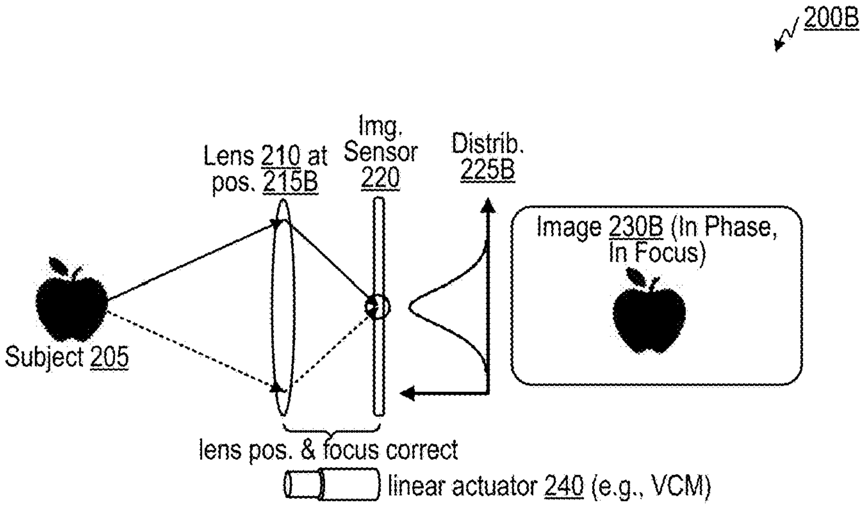
FIG. 2B is a conceptual diagram illustrating the image capture system of FIG. 2A being in phase and in focus, in accordance with some examples.

FIG. 2B is a conceptual diagram 200B illustrating the image capture system of FIG. 2A being in phase and in focus. The lens 210 is positioned at a lens position 215B using the linear actuator 240. The lens position 215B is closer to the image sensor 220 than the lens position 215A. With the lens 210 at the lens position 215B, the light rays from the subject 205 converge at the image sensor 220, and thus reach the same area (e.g., same pixel, same photodiode, same set of pixels, same set of photodiodes) along the image sensor 220. The light from the subject 205 is thus in phase, as indicated by the correspondence between the points at which the light rays reach the image sensor 220, and the corresponding graphed distributions 225B of light from the subject 205. With the lens 210 at the lens position 215B, an image 230B captured using the image sensor 220 is in phase and in focus. Because the image 230B is in phase and in focus, the image 230B appears sharp or clear rather than blurry, as illustrated by the image 230B of the subject 205 (e.g., the apple) appearing sharp and clear. The in-focus and in-phase status indicates that the lens position 215B is the correct distance from the image sensor 220, causing the focus to be correctly focused on the subject 205.

Figure 2C:
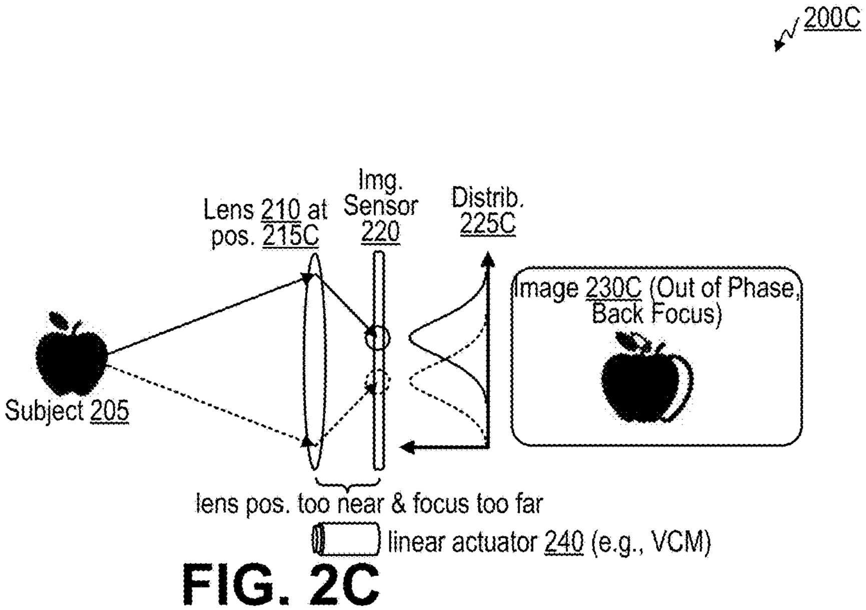
FIG. 2C is a conceptual diagram illustrating the image capture system of FIGS. 2A-2B being out of phase with a back focus, in accordance with some examples.

FIG. 2C is a conceptual diagram illustrating the image capture system of FIGS. 2A-2B being out of phase with a back focus. The lens 210 is positioned at a lens position 215C using the linear actuator 240. The lens position 215C is closer to the image sensor 220 than the lens position 215B and the lens position 215A. With the lens 210 at the lens position 215C, the light rays from the subject 205 never get a chance to converge by the time they reach the image sensor 220, and thus reach different points along the image sensor 220. The light from the subject 205 is thus out of phase, as indicated by the difference in the points at which the light rays reach the image sensor 220, and the corresponding graphed distributions 225C of light from the subject 205. With the lens 210 at the lens position 215C, an image 230C captured using the image sensor 220 is out of phase and out of focus, with a back focus. Because the image 230C is out of phase and out of focus, the image 230C appears blurry and not sharp or clear, as illustrated by the image 230C of the subject 205 (e.g., the apple) appearing to show the subject 205 with double-vision (e.g., illustrated to resemble diplopia or double-vision). The back focus indicates that the lens position 215C is too near to the image sensor 220, causing the focus to be too far from the image capture system (e.g., farther from the image capture system than the subject 205).

Figure 3A:
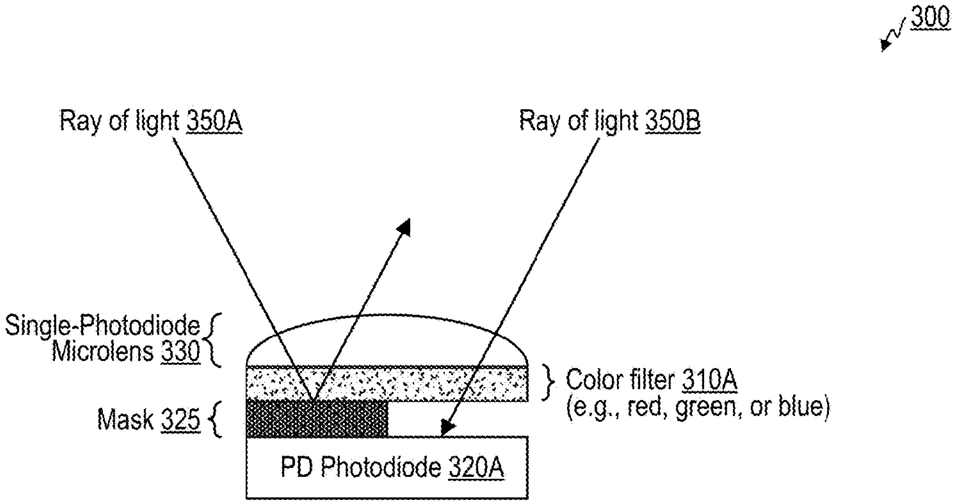
FIG. 3A is a conceptual diagram illustrating a side view of a focus pixel with a phase detection (PD) photodiode that is partially covered with a mask, in accordance with some examples.

FIG. 3A is a conceptual diagram illustrating a side view of a focus pixel 300 with a phase detection (PD) photodiode 320A that is partially covered with a mask 325. The side view of the focus pixel 300 illustrates the single-photodiode microlens 330 over a color filter 310A, which is over a mask 325, the mask 325 covering the left side of the photodiode 320A. A ray of light 350B entering from the right side of the microlens 330 passes through the color filter 310A and reaches the photodiode 320A, while ray of light 350A entering from the left side of the microlens 330 is reflected or blocked by the mask 325. The mask 325 may be at least partially reflective, at least partially opaque, or a combination thereof. In some examples, the mask 325 is black, a shade of grey, or a dark color. It should be understood that a mask such as the mask 325 can cover a left side of a PD photodiode 320A as illustrated in FIG. 3A, a right side of a PD photodiode, a top side of a PD photodiode, or a bottom side of a PD photodiode. In some examples, the mask 325 may be positioned above the color filter 310A and/or above the microlens 330.

Figure 3B:
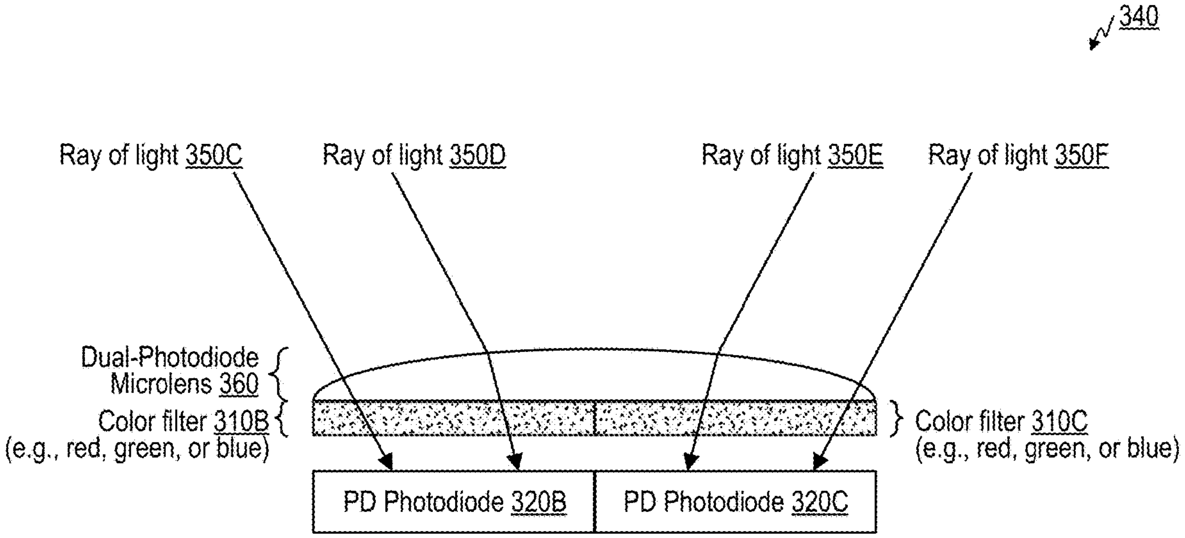
FIG. 3B is a conceptual diagram illustrating a side view of focus pixel(s) with a dual-photodiode microlens covering two phase detection (PD) photodiodes, in accordance with some examples.

FIG. 3B is a conceptual diagram illustrating a side view of a focus pixel arrangement 340 with a dual-photodiode microlens 360 covering two phase detection (PD) photodiodes 320B-320C. The side view of the focus pixel arrangement 340 of FIG. 3B illustrates the dual-photodiode microlens 360 (e.g., 2 photodiodes by 1 photodiode) over one PD photodiode 320B and corresponding color filter 310B on the left and another adjacent PD photodiode 320C and corresponding color filter 310C on the right. Two rays of light 350C and 350D entering from the left side of the microlens 360 pass through the left color filter 310B and reach the left photodiode 320B, while two rays of light 350E and 350F entering from the right side of the microlens 360 pass through the right color filter 310C and reach the right photodiode 320C.

Each color filter of the color filter 310A, the color filter 310B, and the color filter 310C may be any type of color filter. Color filters can filter out color channels other than a color channel corresponding to a color of the color filter, preventing other color channels from reaching a photodiode. Color data from photodiodes filtered using different and corresponding color filters (e.g., red, green, and blue under the Bayer filter scheme) can be combined though demosaicking to produce a full-color image. Each color filter of the color filter 310A, the color filter 310B, and the color filter 310C, may be any color, such as red, green, blue, cyan, yellow, magenta, emerald, or white (transparent). In some examples, the colors of at least two of the color filter 310A, the color filter 310B, and the color filter 310C, can match. In some examples, the colors of at least two of the color filter 310A, the color filter 310B, and the color filter 310C, can be distinct from one another. In some examples, at least one of the color filters (e.g., color filter 310A, the color filter 310B, and/or the color filter 310C) can be missing or removed.

In some examples, the two PD photodiodes 320B-320C under the dual-photodiode microlens 360 in the focus pixel arrangement 340 occupy distinct and adjacent grid cells in a pixel array of an image sensor (e.g., image sensor 130, image sensor 220), in which case the dual-photodiode microlens 360 can be referred to as a 2 pixel×1 pixel microlens. In some examples, a quad-photodiode microlens can be used in place of the dual-photodiode microlens 360, and can cover four photodiodes that each occupy distinct and adjacent grid cells in a pixel array of an image sensor (e.g., image sensor 130, image sensor 220), in which case the quad-photodiode microlens can be referred to as a 2 pixel×2 pixel microlens. In some examples, the two PD photodiodes 320B-320C under the dual-photodiode microlens 360 in the focus pixel arrangement 340 are adjacent to each other but occupy the same grid cell in a pixel array of an image sensor (e.g., image sensor 130, image sensor 220), in which case the focus pixel arrangement 340 can be referred to as a 2PD focus pixel. In some examples, a quad-photodiode microlens can be used in place of the dual-photodiode microlens 360, and can cover four photodiodes that are adjacent to each other but occupy the same grid cell in a pixel array of an image sensor (e.g., image sensor 130, image sensor 220), in which case the focus pixel arrangement 340 can be referred to as a 4PD focus pixel. Similar focus pixel arrangements with more photodiodes can be used, for instance focus pixel arrangements with 8 photodiodes (8PD) or focus pixel arrangements with 12 photodiodes (12PD).

Under PDAF, an image sensor includes a pixel array, or photodiode array. The pixel array or photodiode array can include one or more focus pixels, such as the focus pixel 300 of FIG. 3A and/or the focus pixel arrangement 340 of FIG. 3B. The pixel array or photodiode array can a pattern of one or more focus pixels and/or focus pixel arrangements of either or both of the types illustrated and/or discussed with respect to in FIGS. 3A-3B. In some examples. the pattern can be repeated and/or tiled vertically and/or horizontally across the width and/or height of the surface of the pixel array of the image sensor.

Figure 4:
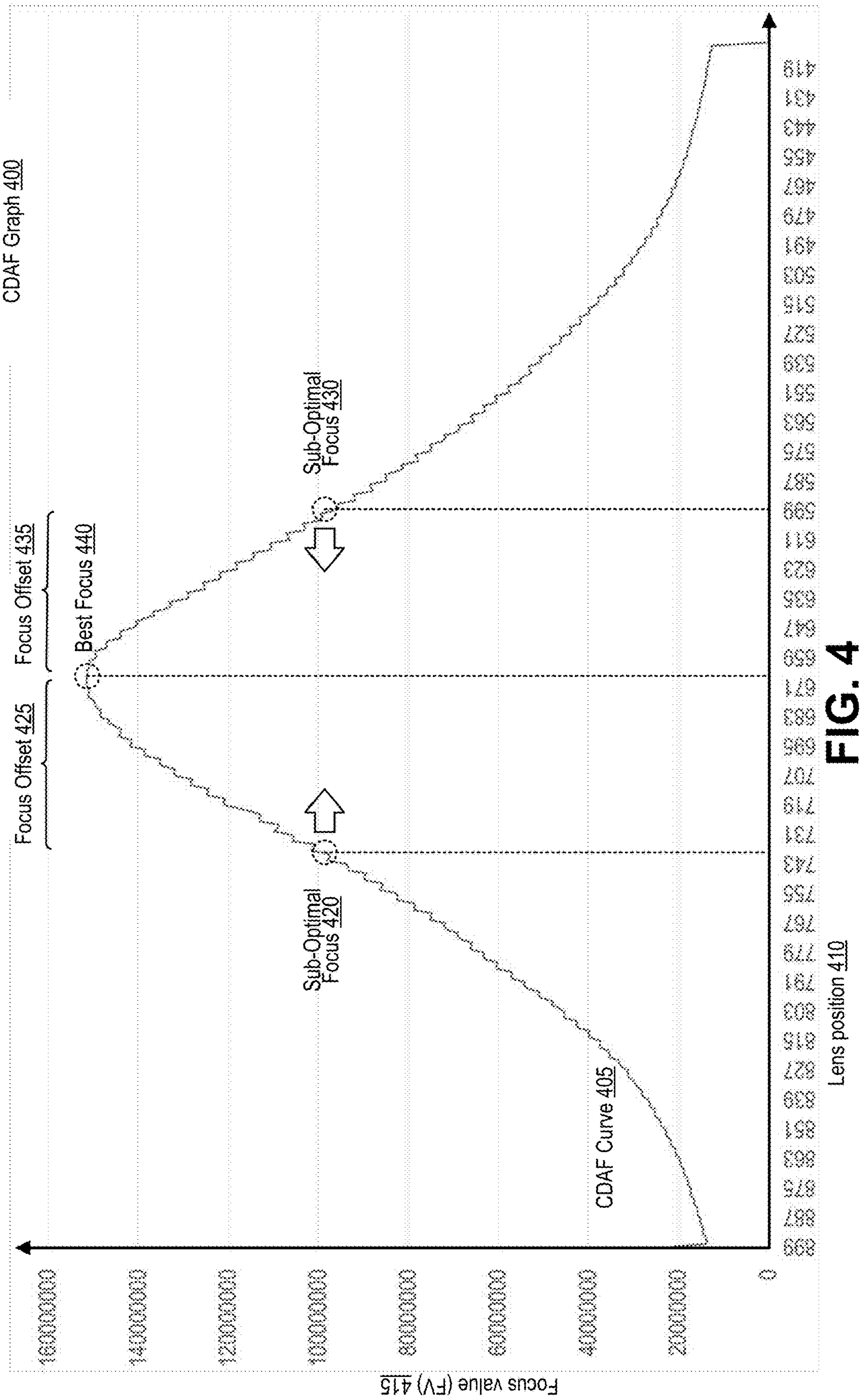
FIG. 4 is a contrast detection autofocus (CDAF) graph illustrating the effects of lens movements on a focus value associated with image contrast, in accordance with some examples.

FIG. 4 is a contrast detection autofocus (CDAF) graph 400 illustrating the effects of lens movements on a focus value associated with image contrast. The CDAF graph 400 includes a CDAF curve 405 plotted on a plane. The horizontal axis of the plane represents lens positions 410, which range from 899 to 419 in the CDAF graph 400. The units for the lens positions 410 can be expressed in terms of lens movement steps, which represent how much electric current is provided to an actuator and/or driver for a motor 250 and/or other mechanism that moves the lens. Lens movement steps can be expressed in units of electric current, such as amperes (A), milliamps (mA), microamps (μA), or nanoamps (nA). For example, the values 899 and 419 along the horizontal axis of the CDAF graph 400 may represent 899 μA and 419 μA, respectively. The units for the lens positions 410 can be micrometers (μm). In some cases, the lens movement steps can be directly related to the lens position in micrometers (μm); for instance, every two lens movement steps (2 μA) can correspond to a lens movement over a distance of 1 μm. On the right-hand side of the horizontal axis, lens position value 419 represents an example of the near-focus lens position 215A from FIG. 2A. On the left-hand side of the horizontal axis, lens position value 899 represents an example of the far-focus lens position 215C from FIG. 2C.

The vertical axis of the plane represents focus values (FV) 415, which range from 0 to 160000000 in the CDAF graph 400. The numerical values for the FV 415 can express a contrast value, a sharpness value, or some combination thereof. In one example, the numerical values for the FV 415 can express a sum of sharpness values for all valid pixels in a region of interest (ROI) of the corresponding image frame. The sharpness and/or contrast values for these pixels in the ROI may be obtained from an image sensor (e.g., the image sensor 130, the image sensor 220), from a hardware filter, from an image processor 150, or some combination thereof. The hardware filter may include a high-pass filter, a low-pass filter, a band-stop filter, or some combination thereof. The FV can be determined in the Bayer color domain, the RGB color domain, the YUV domain, the luminosity domain, or some combination thereof. While the maximum FV 415 in the CDAF graph 400 is 160000000, this is just an example. Different images of different scenes may have different focus values Thus, the maximum focus values as graphed can vary for different scenes. For example, the maximum FV for an image of a finely-detailed scene can be larger than for an image of a less-detailed scene.

A lens (e.g., lens 115, lens 210) of an image capture device is moved through a range of positions between far-focus lens position value 899 and near-focus lens position value 419 during a CDAF procedure. In some examples, the lens is moved from far-focus lens position value 899 to near-focus lens position value 419, represented from left to right along the horizontal axis representing lens position 410. In some examples, the movements are stepwise, in that the lens is moved from a first position to a second position, is stationary for a period, and then is moved from the second position to a third position, and so forth. Image frames are captured while the lens is at each of the lens positions, and the focus value (FV) 415 is determined based on these image frames and graphed as the CDAF curve 405 by determining a contrast between a subject and a background in the image frame. In some examples, a sub-optimal focus 420 value of approximately 100000000 is reached along the CDAF curve 405 at approximately lens position 740, and the image capture device continues to move the lens as indicated by the arrow adjacent to the sub-optimal focus 420 value. In some examples, a best focus 440 value of approximately 150000000 is reached at the peak of the CDAF curve 405 at approximately lens position 670. In some examples, the image capture device continues to move the lens after reaching the best focus 440 value, to test other lens positions in case they have a higher focus value. In some examples, a sub-optimal focus 430 value of approximately 100000000 is reached along the CDAF curve 405 at approximately lens position 599, and the image capture device knows that it overshot the best focus 440 value and should go back to the best focus 440 value at approximately lens position 740 as indicated by the arrow adjacent to the sub-optimal focus 430 value. A focus offset 425 refers to a difference in lens position 410 between a lens position of the sub-optimal focus 420 value and the best focus 440 value. A focus offset 435 refers to a difference in lens position 410 between a lens position of the sub-optimal focus 430 value and the best focus 440 value. In some examples, the sub-optimal focus 420 value can be an example of a focus value and/or lens position determined using PDAF. In some examples, the sub-optimal focus 430 value can be an example of a focus value and/or lens position determined using PDAF.

Figure 5:
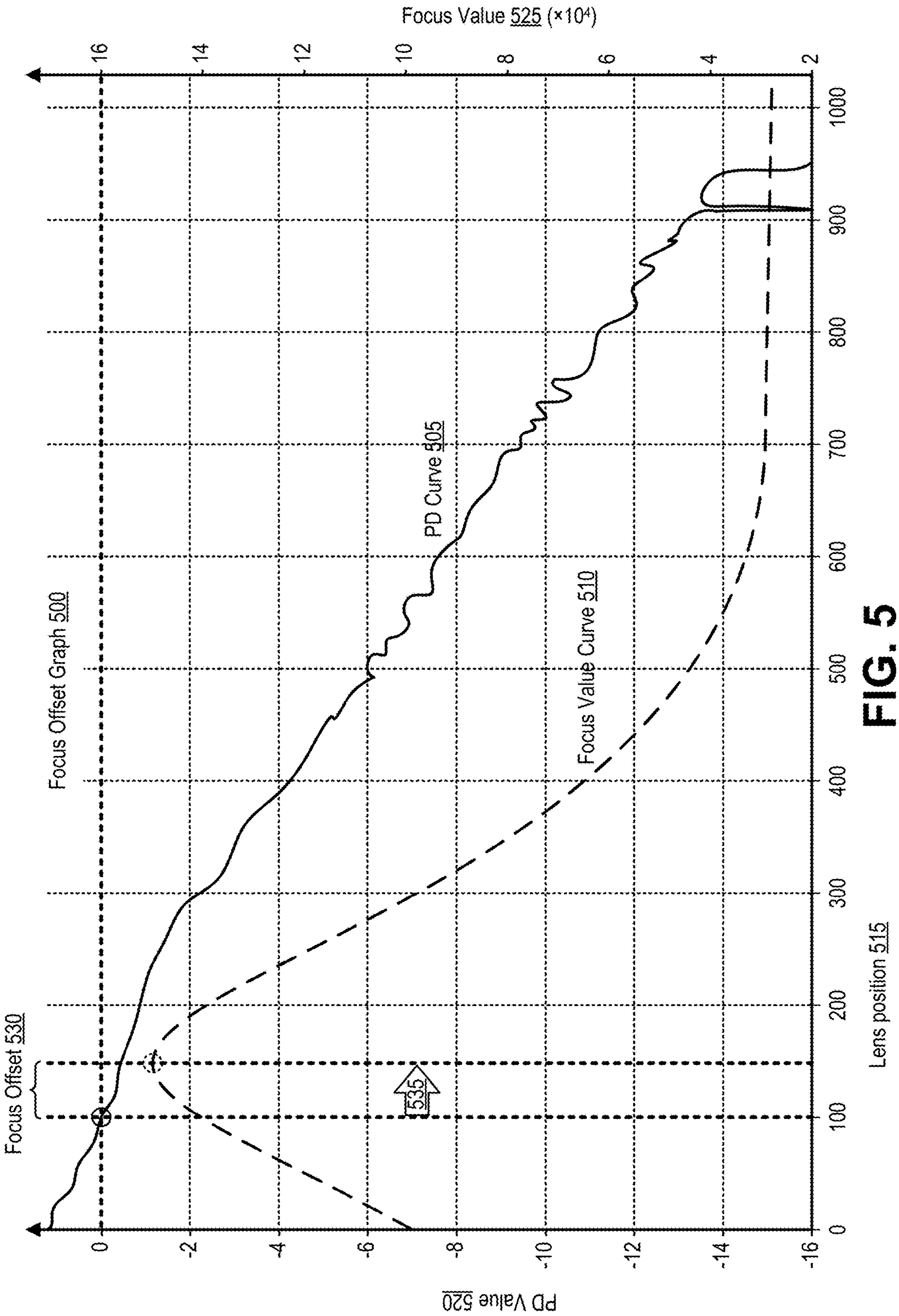
FIG. 5 is a focus offset graph illustrating a focus offset between a lens position corresponding to a phase difference of zero and a lens position corresponding to a peak focus value, in accordance with some examples.

FIG. 5 is a focus offset graph 500 illustrating a focus offset 530 between a lens position corresponding to a phase difference of zero and a lens position corresponding to a peak focus value. The focus offset graph 500 includes a phase difference (PD) curve 505 plotted on a plane and a focus value curve 510 plotted on the same plane. The horizontal axis of the plane represents lens position 515, which ranges from 0 to approximately 1020 in the focus offset graph 500. As in FIG. 4, the lens position 515 can be expressed in terms of lens movement steps, units of electric current (e.g., A, mA, μA, nA), micrometers (μm), and/or portions of a total possible lens movement distance.

The vertical axis for the plane includes two different measurement scales. One of the measurement scales for the vertical axis represents phase difference (PD) value 520, while the other represents focus value 525. PD value 520 is indicated on the left-hand side of the focus offset graph 500 and ranges in value from −16 up to approximately 1. The PD curve 505 is plotted against the PD value 520 scale and the lens position 515. The PD curve 505 is reaches a PD value 520 of zero at approximately lens position of 100, indicating that the focus is in-phase as in FIG. 2B. Focus value 525 is indicated on the right-hand side of the focus offset graph 500 and ranges in value from $2\times10^4$ up to approximately $17\times10^4$. A peak of the focus value curve 510, representing the best focus value (approximately $15\times10^4$), has a corresponding lens position of approximately 150.

Thus, an image capture system that performs PDAF according to the PDAF curve 505 will find the lens position of 100 to be in-phase and optimal. However, the truly optimal focus, determined by focus value 525 using the focus value curve 510 (e.g., using CDAF and/or adaptive focus offset correction 870), is actually at approximately the lens position of 150. Thus, there is a focus offset 530 of 50 between the lens position of 100 (determined according to the PDAF curve 505) and the lens position of 150 (determined according to the focus value curve 510). In some examples, an image capture system may first find the lens position of 100 according to the PDAF curve 505, then move the lens from the lens position of 100 to the lens position of 150 along a movement 535 for the distance of the focus offset 530 according to the focus value curve 510.

Figure 6A:
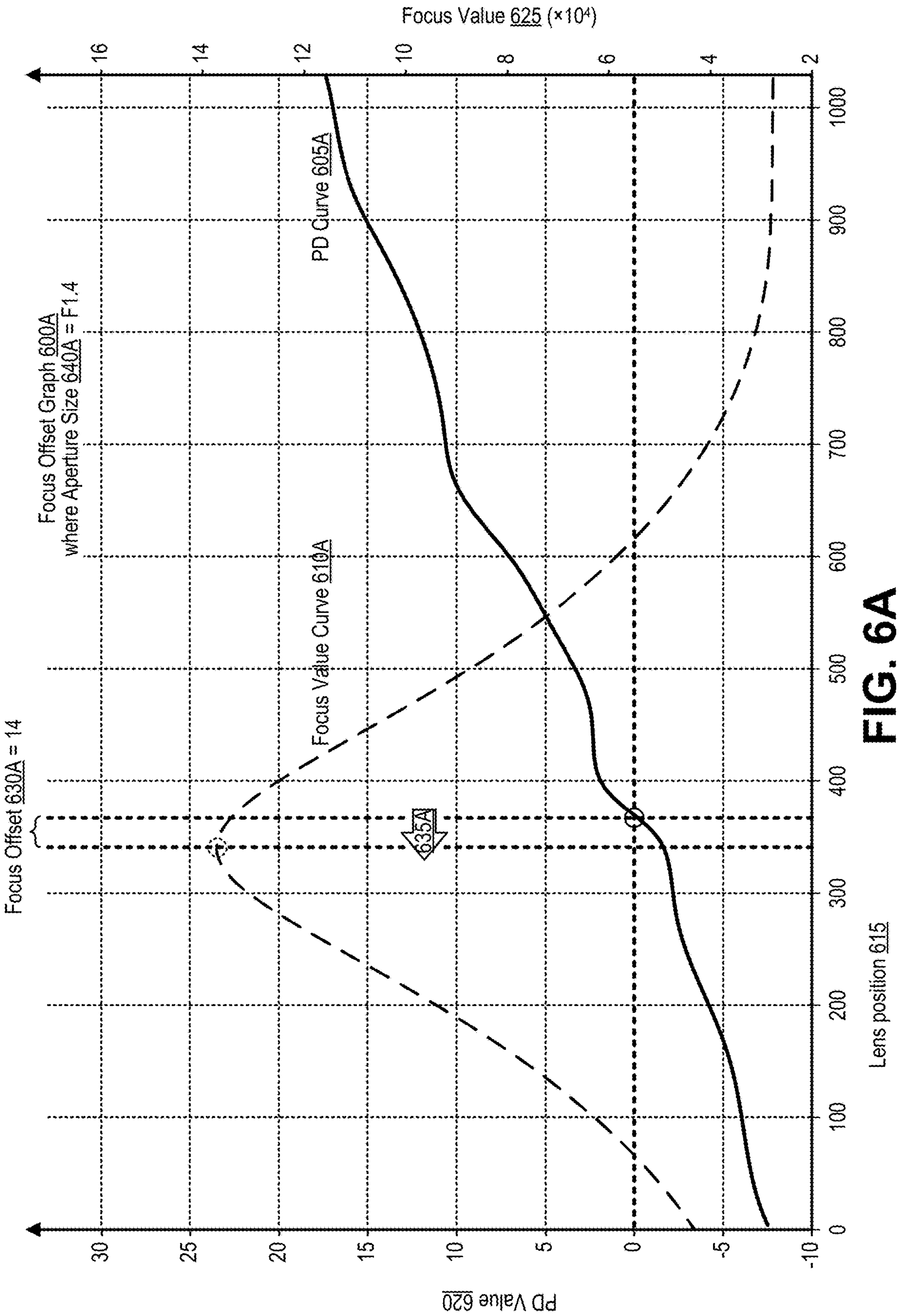
FIG. 6A is a focus offset graph illustrating a focus offset with an aperture size of F 1.4 for an image capture system, in accordance with some examples.

FIG. 6A is a focus offset graph illustrating a focus offset 630A with an aperture size 640A of F 1.4 for an image capture system. The focus offset graph 600A, similarly to the focus graph 500, includes a phase difference (PD) curve 605A and a focus value curve 610A plotted on a plane, with horizontal axis of the plane representing lens position 615 (ranging from 0 to approximately 1020) and the vertical axis of the plane representing phase difference (PD) value 620 and focus value 625. The PD curve 605A reaches a PD value 620 of zero at a lens position 615 of approximately 361, indicating that the focus is in-phase as in FIG. 2B. A peak of the focus value curve 610A, representing the best focus value (approximately $13.5\times10^4$), has a corresponding lens position of approximately 350.

Thus, an image capture system that performs PDAF according to the PDAF curve 605A will find the lens position of 361 to be in-phase and optimal. However, the truly optimal focus, determined by focus value 625 using the focus value curve 610 (e.g., using CDAF and/or adaptive focus offset correction 870), is actually at approximately lens position 350. Thus, there is a focus offset 630A of 14 between the lens position of 361 (determined according to the PDAF curve 605A) and the lens position of 350 (determined according to the focus value curve 610A). In some examples, an image capture system may first find the lens position of 361 according to the PDAF curve 605A, then move the lens from the lens position of 361 to the lens position 350 along a movement 635A for the distance of the focus offset 630A according to the focus value curve 610A.

Figure 6B:
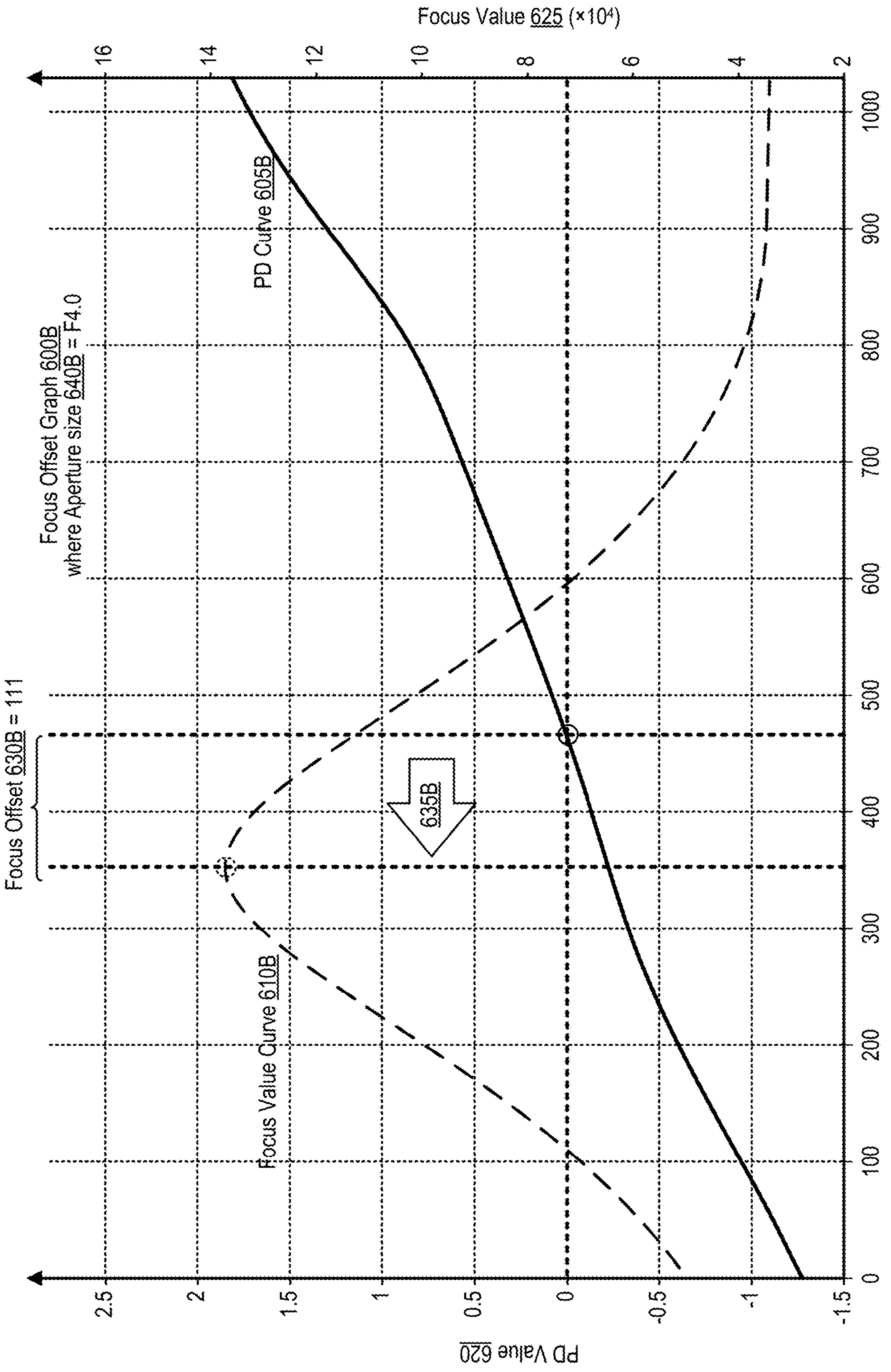
FIG. 6B is a focus offset graph illustrating a focus offset with an aperture size of F 4.0 for the image capture system of FIG. 6A, in accordance with some examples.

FIG. 6B is a focus offset graph illustrating a focus offset with an aperture size of F 4.0 for the image capture system of FIG. 6A. The focus offset graph 600B, similarly to the focus graph 500, includes a phase difference (PD) curve 605B and a focus value curve 610B plotted on a plane, with horizontal axis of the plane representing lens position 615 (ranging from 0 to approximately 1020) and the vertical axis of the plane representing phase difference (PD) value 620 and focus value 625. The PD curve 605B reaches a PD value 620 of zero at a lens position 615 of approximately 470, indicating that the focus is in-phase as in FIG. 2B. A peak of the focus value curve 610B, representing the best focus value (approximately $13.5\times10^4$), has a corresponding lens position of approximately 359.

Thus, an image capture system that performs PDAF according to the PDAF curve 605B will find the lens position of 470 to be in-phase and optimal. However, the truly optimal focus, determined by focus value 625 using the focus value curve 610 (e.g., using CDAF and/or adaptive focus offset correction 870), is actually at approximately lens position 359. Thus, there is a focus offset 630B of 140 between the lens position of 470 (determined according to the PDAF curve 605B) and the lens position of 359 (determined according to the focus value curve 610B). In some examples, an image capture system may first find the lens position of 470 according to the PDAF curve 605B, then move the lens from the lens position of 470 to the lens position 359 along a movement 635B for the distance of the focus offset 630B according to the focus value curve 610B.

Even though the focus offset graph 600A of FIG. 6A and the focus offset graph 600B of FIG. 6B are generated using the same image capture system, there is a significant difference between the focus offset 630A (14) at the aperture size 640A of F1.4 in FIG. 6A and the focus offset 630B (111) at the aperture size 640B of F4.0 in FIG. 6B. Thus, aperture size has an effect on focus offset. Other image capture settings can also have effects on focus offset, as suggested by FIGS. 7A-7D.

FIG. 7A is a table 700A indicating how different values for lux 705 result in differences in phase difference (PD) values 715 and defocus values 720 at a lens position 710 reached via contrast detection autofocus (CDAF). For instance, at a lux 705 value of 1000, the lens position 710 reached after CDAF is 654, the corresponding PD value 715 at that lens position 710 (654) is −0.51, and the defocus value 720 at that lens position 710 (654) is −88.51. At a lux 705 value of 100, the lens position 710 reached after CDAF is 646, the corresponding PD value 715 at that lens position 710 (646) is −0.42, and the defocus value 720 at that lens position 710 (646) is −73.2. At a lux 705 value of 20, the lens position 710 reached after CDAF is 618, the corresponding PD value 715 at that lens position 710 (618) is 0.02, and the defocus value 720 at that lens position 710 (618) is 2.33. Because the PD values 715 are non-zero for each of the lens positions 710, focus offsets are non-zero. The table 700A shows that lux 705 has an effect on focus offset.

FIG. 7B is a focus offset map 700B indicating examples of different focus offset values at different regions of interest (ROI) along an image frame. The focus offset map 700B is illustrated as an 8×6 grid, with each cell in the grid representing a collection (e.g., a square group and/or a rectangular group) of pixels of an image frame arranged as illustrated in the focus offset map 700B. The number in each cell represents the focus offset value for the corresponding collection of pixels, from a PDAF-optimal lens position to a focus-value-optimal lens position (e.g., CDAF-optimal lens position). The focus offset values range from 5 to −68. Cells with focus values whose absolute value is higher have darker shading than cells with focus values whose absolute value is lower. The focus offset map 700B shows that different choices of region of interest (ROI) have an effect on focus offset.

FIG. 7C is a graph 700C indicating examples of different focus offset 730 values for different camera modules. The graph 700C includes a vertical axis measuring focus offset 730 from 0 to −50. A camera module A has a focus offset 730 of approximately −33. A camera module B has a focus offset 730 of approximately −42. A camera module C has a focus offset 730 of approximately −25. The graph 700C shows that different camera modules (e.g., different hardware instances of the same camera) have an effect on focus offset.

FIG. 7D is a graph 700D indicating examples of different focus offset values for different distances. The graph 700D includes a vertical axis measuring focus offset 730 from 20 to −60. The graph 700D includes a horizontal axis measuring distance 735 between the camera and the subject (e.g., between the subject 205 and the lens 210 or the image sensor 220) (in centimeters) from 0 to 100. Curves are graphed representing three cameras with different focus pixel arrangement types (2PD, 8PD, and 12PD, respectively). As illustrated in the graph 700D, distance 735 and focus pixel arrangement type both have an effect on focus offset. In some examples, lens position can be a proxy for distance 735 between the image capture system and the subject, since lens position 1105 changes based on this distance 735.

Figure 8A:
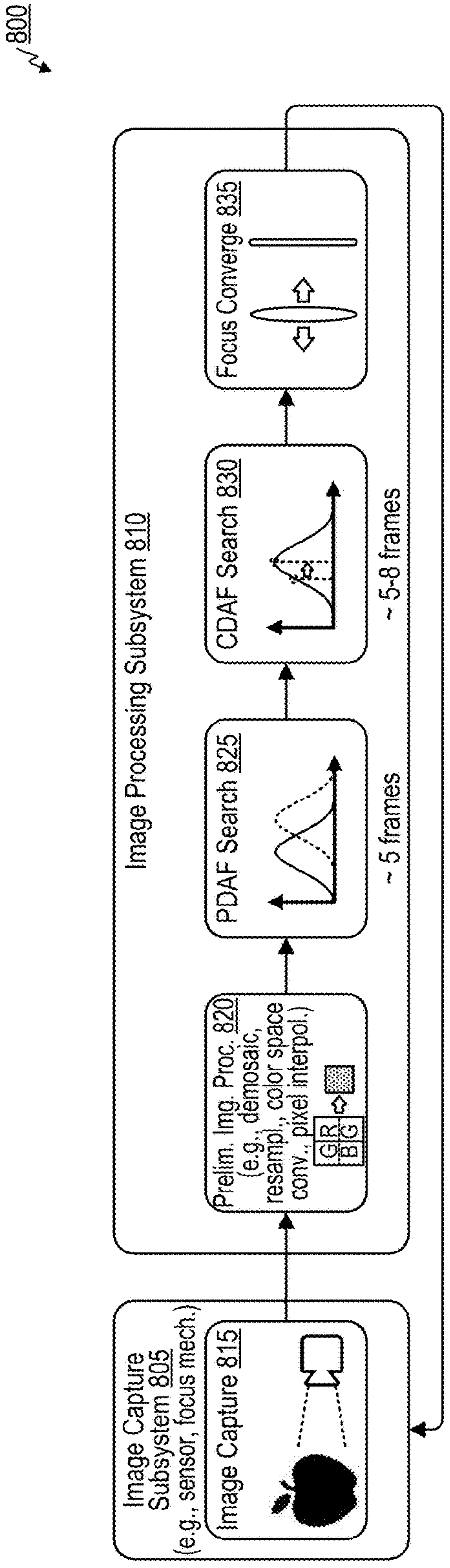
FIG. 8A is a block diagram illustrating an imaging system that determines a focus setting using phase detection autofocus (PDAF) search followed by contrast detection autofocus (CDAF) search, in accordance with some examples.

FIG. 8A is a block diagram illustrating an imaging system 800 that determines a focus setting using phase detection autofocus (PDAF) search 825 followed by contrast detection autofocus (CDAF) search 830. The imaging system 800 includes an image capture subsystem 805 and an image processing subsystem 810. The image capture subsystem 805 can include, for instance, at least portion(s) of the image capture device 105A of FIG. 1 and/or at least portion(s) of the image capture system of FIGS. 2A-2C. In some examples, the image capture subsystem 805 can include at least portion(s) of the image processing device 105B. The image processing subsystem 810 can include at least portion (s) of the image processing device 105B. In some examples, image processing subsystem 810 can include at least portion (s) of the image capture device 105A of FIG. 1 and/or at least portion(s) of the image capture system of FIGS. 2A-2C.

The image capture subsystem 805 performs image capture 815, for instance using an image sensor (e.g., image sensor 130, image sensor 220), to capture image data of a scene. The scene may include a subject to be focused on (e.g., subject 205). The image processing subsystem 810 may perform certain operations for preliminary image processing 820, for instance to perform analog to digital conversion (ADC), gain control, demosaicking, image frame resampling (e.g., downsampling, upsampling, supersampling), color space conversion (e.g., between Bayer, RGB, and/or YUV color spaces), pixel interpolation, bad pixel correction, automatic white balance (AWB), automatic black balance (ABB), automatic gain control (AGC), automatic exposure control (AEC), red eye correction, lens rolloff correction, vignetting, vignetting correction, motion compensation, rolling shutter compensation, tone correction, brightness correction, contrast correction, saturation correction, color mixer correction, or a combination thereof. In some examples, certain operations and/or aspects of the preliminary image processing 820 can be performed by using, at least in part, the image capture subsystem 805, such as aspects of ADC and/or gain control. In some examples, certain operations and/or aspects of the preliminary image processing 820 can be performed by using, at least in part, an ISP 154 of the image processing subsystem 810, such as aspects of demosaicking, color space conversion, image frame resampling, pixel interpolation, bad pixel correction, or a combination thereof. In some examples, certain operations and/or aspects of the preliminary image processing 820 can be performed by using, at least in part, a host processor 152 of the image processing subsystem 810, such as aspects of AWB, ABB, AGC, AEC, red eye correction, lens rolloff correction, vignetting, vignetting correction, motion compensation, rolling shutter compensation, tone correction, brightness correction, contrast correction, saturation correction, color mixer correction, or a combination thereof.

The image processing subsystem 810 performs a PDAF search 825 based on the focus pixel data from the image data from the image capture 815. In some examples, the PDAF search 825 is performed after the image data has undergone at least some of the preliminary image processing 820, such as the demosaicking and/or other operations and/or aspects of the preliminary image processing 820 described above. The focus pixel data is from the focus pixels of the image sensor of the image capture subsystem 805. The image processing subsystem 810 perform a PDAF search 825 to identify whether the image capture subsystem 805 is out of phase and thus out of focus with the lens (e.g., lens 115, lens 210) of the image capture subsystem 805 at its current lens position (e.g., lens position 215A-215C, lens position 410, lens position 515, lens position 615, lens position 710). If the image capture subsystem 805 is out of phase and thus out of focus, the image processing subsystem 810 uses the PDAF search 825 to determine a direction in which the light is out of phase to determine whether the lens needs to be moved forward or backward, and can identify a phase disparity or phase difference indicating an extent or level of how out of phase the light is to determine how far the lens is to be moved to be in phase. In this way, the image processing subsystem 810 perform the PDAF search 825 to identify a first focus setting, which may be referred to as a PDAF-optimal focus setting. The first focus setting can identify a lens position at which the PDAF search 825 indicates the light from the subject of the image is, or is predicted based on the PDAF search 825 to be, in phase (e.g., as in FIG. 2B) rather than out of phase (e.g., as in FIG. 2A or FIG. 2C).

To complete the PDAF search 825, the image processing subsystem 810 moves the lens of the image capture subsystem 805 (e.g., using the linear actuator 240) to the lens position indicated by the first focus setting. In some examples, the lens position identified by the first focus setting can be a lens position at which a phase difference is equal to zero, such as the lens position 515 of 100 in FIG. 5 at which the PD value 520 of the PD curve 505 is equal to zero, the lens position 615 of 350 in FIG. 6A at which the PD value 620 of the PD curve 605A is equal to zero, or the lens position 615 of 359 in FIG. 6B at which the PD value 620 of the PD curve 605B is equal to zero. In some examples, the lens position identified by the first focus setting can be a lens position at which a phase difference is within a threshold range of zero, for instance allowing for a threshold deviation in PD value of 0.5, 0.1, 0.05, 0.01, 0.005, 0.001, or the like. If the lens position found by the PDAF search 825 is not within the threshold range of zero, the image processing subsystem 810 perform another PDAF search 825. In some examples, the PDAF search 825 takes approximately 5 frames of time (e.g., enough time that the image capture subsystem 805 can capture 5 image frames during the duration of the PDAF search 825).

Next, the image processing subsystem 810 performs a CDAF search 830 starting from the lens position indicated by the first focus setting that is output by the PDAF search 825. To perform the CDAF search 830, the image processing subsystem 810 moves the lens of the image capture subsystem 805 (e.g., using the linear actuator 240) step-wise through a range of lens positions, with pre-specified distance intervals between each respective tested lens position, and attempts to find a lens position at which contrast between the subject's pixels and background pixels are maximized and/or at which a focus value is maximized (e.g., focus value 415, focus value 525, focus value 625). The range can start from, and/or include, the lens position indicated by the first focus setting that is output by the PDAF search 825. In this way, the image processing subsystem 810 perform the CDAF search 830 to identify a second focus setting, which may be referred to as a CDAF-optimal focus setting. The second focus setting can identify a lens position at which the CDAF search 830 indicates the light from the subject of the image has, or is predicted based on the CDAF search 830 to have, a maximized focus value and/or a maximized contrast between the subject's pixels and background pixels. To complete the CDAF search 830, the image processing subsystem 810 moves the lens of the image capture subsystem 805 (e.g., using the linear actuator 240) to the lens position indicated by the second focus setting. The second focus setting determined using the CDAF search 830 can compensate for and/or correct errors (e.g. calibration errors, disparities due to aperture size, disparities due to temperature, disparities due to lux, disparities due to ROI, etc.) in the first focus setting determined using the PDAF search 825. In some examples, the CDAF search 830 takes approximately 5-8 frames of time (e.g., enough time that the image capture subsystem 805 can capture 5-8 image frames during the duration of the CDAF search 830). CDAF search 830 is thus fairly slow, and cause increased power usage (e.g., draining battery life rapidly and in some cases requiring additional components for heat dissipation), and can cause wear and tear on components due to repeated rapid movements back and forth, sometimes referred to as breathing.

The image processing subsystem 810 performs focus convergence 835, referring to the image processing subsystem 810 ultimately determining the final lens position (as indicated by the second focus setting) and moving the lens to the final lens position (as indicated by the second focus setting). Because the CDAF search 830 is slow, focus convergence 835 takes a long time—a total of 10-13 frames—resulting in an inefficient autofocus system with a sub-optimal user experience.

Figure 8B:
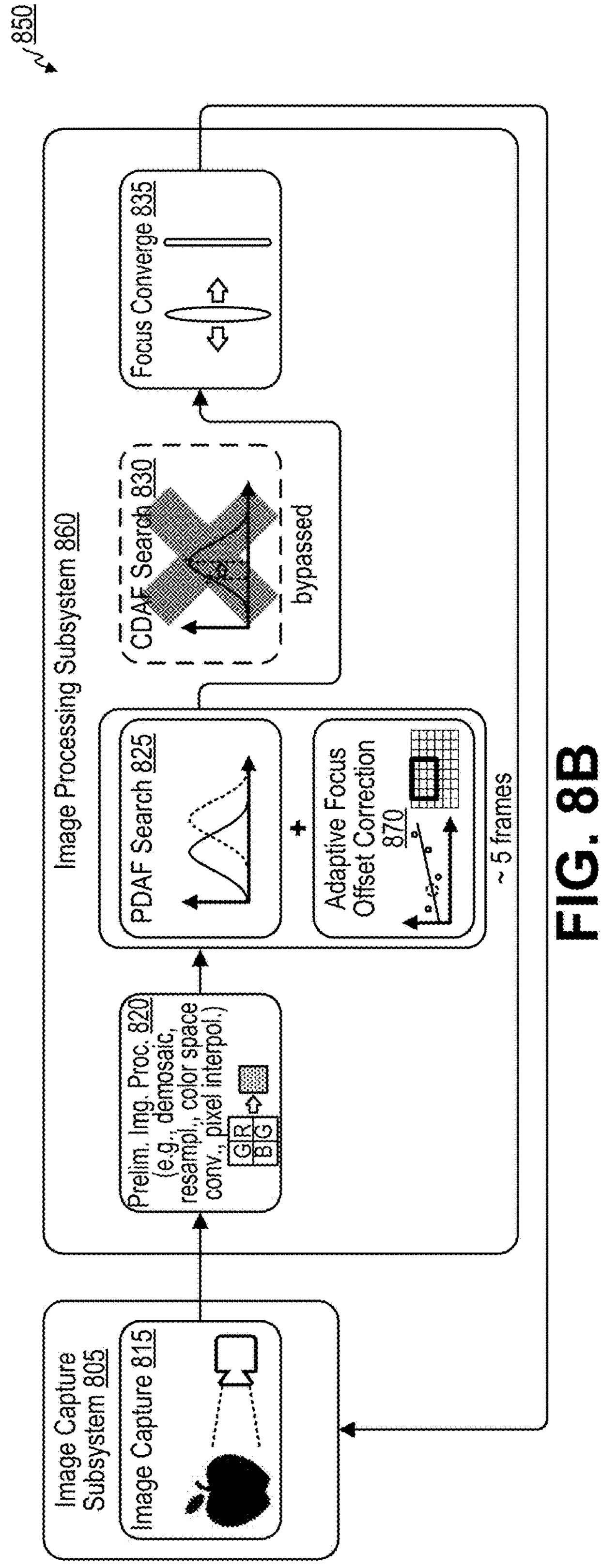
FIG. 8B is a block diagram illustrating an imaging system that determines a focus setting using phase detection autofocus (PDAF) search and adaptive focus offset correction, bypassing contrast detection autofocus (CDAF) search, in accordance with some examples.

FIG. 8B is a block diagram illustrating an imaging system 850 that determines a focus setting using phase detection autofocus (PDAF) search 825 and adaptive focus offset correction 870, bypassing contrast detection autofocus (CDAF) search 830. Like the imaging system 800 of FIG. 8A, the imaging system 850 of FIG. 8B includes an image capture subsystem 805 that performs image capture 815 and an image processing subsystem 810 that performs preliminary image processing 820 and PDAF search 825. The image processing subsystem 810 also performs an adaptive focus offset correction 870, in which the image processing subsystem 810 determines a focus offset (e.g., focus offset 425, focus offset 435, focus offset 530, focus offset 630A, focus offset 630B, focus offset 730) by using image capture settings (e.g., aperture size 915, temperature 920, lux 925, lens position 930, and/or region of interest 935) as inputs to a trained model that outputs the focus offset in response. Examples of the trained model, training of the trained model, use of trained model, systems that can include the trained model, and/or processes that can use the trained model are illustrated in FIGS. 9, 10, 11, 12, 13, 14, and 15. In some examples, the adaptive focus offset correction 870 can determine the focus offset at least partially in parallel with the PDAF search 825 (e.g., simultaneously and/or contemporaneously). In some examples, the PDAF search 825 and the adaptive focus offset correction 870, together, take approximately 5 frames of time (e.g., enough time that the image capture subsystem 805 can capture 5 image frames during the duration of both), which is the same approximate duration of the PDAF search 825 on its own. Thus, use of the PDAF search 825 and the adaptive focus offset correction 870 as in the imaging system 850 of FIG. 8B produces significant time savings for focus convergence 835 over use of the PDAF search 825 with the CDAF search 830 as in the imaging system 800 of FIG. 8A. Use of the PDAF search 825 and the adaptive focus offset correction 870 as in the imaging system 850 of FIG. 8B also produces less wear and tear on components by bypassing the CDAF search 830, and uses less power (e.g., less battery consumption and/or need for thermal dissipation) over use of the PDAF search 825 with the CDAF search 830 as in the imaging system 800 of FIG. 8A.

Figure 9:
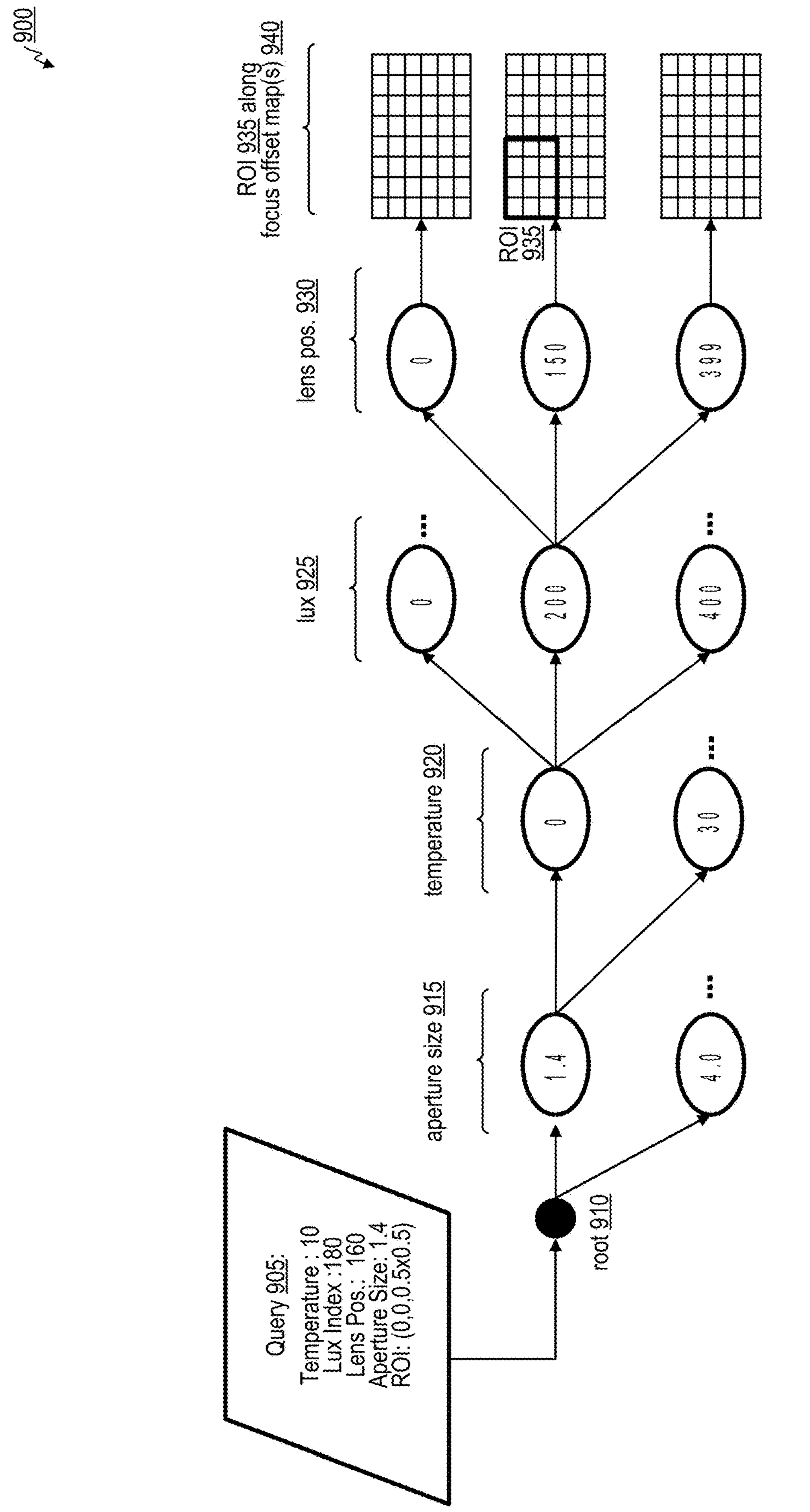
FIG. 9 is a tree diagram illustrating determination of a focus offset using adaptive focus offset correction engine based on a query, in accordance with some examples.

FIG. 9 is a tree diagram 900 illustrating determination of a focus offset using adaptive focus offset correction engine based on a query 905. The adaptive focus offset correction engine performs adaptive focus offset correction 870 as discussed with respect to FIG. 8B by submitting a query with image capture settings, for example the query 905, to the adaptive focus offset correction engine. The adaptive focus offset correction engine receives the query 905. The query 905 includes example values for various image capture settings, including a temperature of 10, a lux index of 180, a lens position of 160, an aperture size of 1.4, and an ROI at (0,0) (indicating the upper-left corner of the image frame) with dimensions 0.5×0.5 (indicating a width spanning half of the image frame width and a height spanning half of the image frame height).

The tree diagram 900 represents a decision tree and/or a random forest of the adaptive focus offset correction engine, and receives the query 905 at the root 910 of the tree. The tree splits into nodes based on aperture size 915, with possible options for aperture size 915 including 1.4 and 4.0. The query 905 indicates an aperture size of 1.4, so of the aperture size 915 nodes of the tree, the 1.4 node is chosen. The tree splits into further nodes based on temperature 920, with possible options for temperature 920 including 0 and 30. The query 905 indicates a temperature of 10, so of the temperature 920 nodes of the tree, the 0 node is chosen, since 0 is closer to 10 than 30 is. The tree splits into further nodes based on lux 925, with possible options for lux 925 including 0, 200, and 400. The query 905 indicates a lux index of 180, so of the lux 925 nodes of the tree, the 200 node is chosen, since 200 is closer to 180 than either 0 or 400 are.

The tree splits into further nodes based on lens position 930, with possible options for lens position 930 including 0, 150, and 399. The query 905 indicates a lens position of 160, so of the lens position 930 nodes of the tree, the 150 node is chosen, since 160 is closer to 150 than either 0 or 399 are. The combination of an aperture size 915 selection of 1.4, a temperature 920 selection of 0, a lux 925 selection of 200, and a lens position 930 selection of 150 ends in a focus offset map of the focus offset maps 940. Different focus offset maps 940 are maintained for different ends (child nodes with no further child nodes) of the tree.

Each of the focus offset maps 940 is illustrated as an 8×6 grid, with each cell in the grid representing a collection (e.g., a square group and/or a rectangular group) of pixels of an image frame arranged as illustrated in the focus offset maps 940. The focus offset map 700B is an example of one of the focus offset maps 940. Each focus offset map of the focus offset maps 940 may include numbers in each cell corresponding to focus offset values for an ROI 935 in each cell, as in the numbers in the focus offset map 700B. It should be understood that focus offset maps 940 may include different dimensions than the illustrated 8×6 grid, and can for example break the image frame into a grid with more or fewer cells than the illustrated 8×6 grid.

In the selected focus offset map (the central focus offset map of the three illustrated focus offset maps 940), an ROI is illustrated starting at position (0,0) (the upper-left corner) and with dimensions of 0.5×0.5 (indicating a width spanning half of the image frame width and a height spanning half of the image frame height) as indicated in the query 905. For an ROI spanning only a single cell of a focus offset map (or a portion thereof), the focus offset value output by the adaptive focus offset correction engine using the tree may be the focus offset value stored in that cell on the selected focus offset map. For an ROI spanning multiple cells in the focus offset map, such as the ROI 935 illustrated in FIG. 9, the focus offset value output by the adaptive focus offset correction engine using the tree may be the mean, median, mode, maximum, or minimum of the focus offset values in the cells in the ROI 935 of the selected focus offset map.

While only the selected branches of the tree, and the other branches of the lens position 930 nodes, are illustrated leading all the way up to the corresponding focus offset maps 940, it should be understood that each illustrated node with an ellipse after leads to further branches and further nodes similar to those that are illustrated.

In some cases, the query 905 may include additional image capture settings beyond those illustrated in FIG. 9, and the tree may include further branches based on those additional image capture settings. For instance, the query 905 may include, and the tree may include further branches based on, exposure time, shutter speed, ISO, optical zoom level, digital zoom level, whether flash is enabled or not, distance to subject, camera hardware, camera module type, camera model, or a combination thereof.

Figure 10:
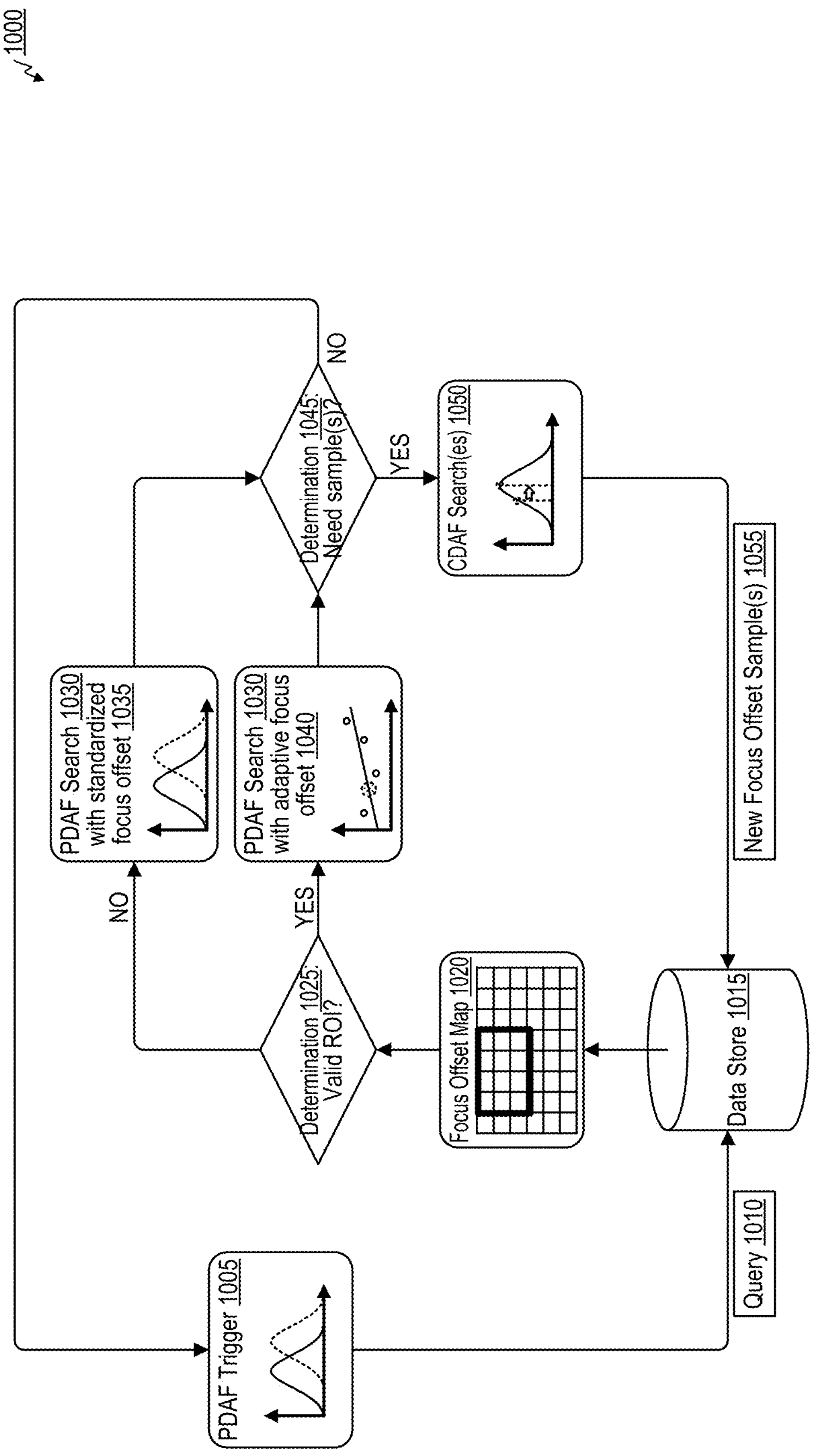
FIG. 10 is a block diagram illustrating an architecture for training and using the adaptive focus offset correction engine, in accordance with some examples.

FIG. 10 is a block diagram 1000 illustrating an architecture for training and using the adaptive focus offset correction engine. An imaging system with an adaptive focus offset correction engine can train and/or use the adaptive focus offset correction engine for adaptive focus offset correction 870 as illustrated in FIG. 10. The adaptive focus offset correction engine receives a PDAF trigger 1005 indicating that PDAF search 825 and/or adaptive focus offset correction 870 should be performed on image data received from an image sensor of an image capture subsystem 805 and/or processed using preliminary image processing 820. The PDAF trigger 1005 causes the adaptive focus offset correction engine to send a query 1010, which may for instance be similar to the query 905, to a data store 1015. The data store 1015 may be organized into a tree, as in the tree diagram 900 of FIG. 9. The data store 1015 may output a focus offset map 1020.

The adaptive focus offset correction engine checks an ROI identified in the query 1010 in the focus offset map 1020, to make a determination 1025 as to whether the ROI is valid. The determination 1025 as to whether the ROI is valid checks whether the focus offset map 1020 includes at least a threshold amount of focus offset sample data for the ROI. If, at the determination 1025, the adaptive focus offset correction engine identifies that the ROI is invalid, meaning that the focus offset map 1020 does not include at least the threshold amount of focus offset sample data for the ROI, the adaptive focus offset correction engine performs a PDAF search 1030 (e.g., as in PDAF search 825) that the adaptive focus offset correction engine offsets using a standardized focus offset 1035. In some examples, the standardized focus offset 1035 may be a focus offset value determined using a calibration of the camera corresponding to, during, and/or following manufacturing of the camera. In some examples, the standardized focus offset 1035 may be a focus offset value determined using a calibration of the camera that occurs periodically (e.g., every day, every week, every month, etc.) to ensure that the camera remains calibrated.

If, at the determination 1025, the adaptive focus offset correction engine identifies that the ROI is valid, meaning that the focus offset map 1020 does include at least the threshold amount of focus offset sample data for the ROI, the adaptive focus offset correction engine performs a PDAF search 1030 (e.g., as in PDAF search 825) that the adaptive focus offset correction engine offsets using an adaptive focus offset 1040 determined using adaptive focus offset correction 870. For instance, the adaptive focus offset 1040 may be determined as a focus offset corresponding to the ROI in the focus offset map 1020.

The adaptive focus offset correction engine checks to make a determination 1045 as to whether more samples are needed for the focus offset map 1020 and/or other focus offset maps. In some examples, the determination 1045 may be based on the determination 1025, and/or the determination 1025 may be based on the determination 1045. If, at the determination 1045, the adaptive focus offset correction engine identifies that the focus offset map 1020 and/or other focus offset maps need more samples, the adaptive focus offset correction engine performs one or more CDAF search (es) 1050 (e.g., as in CDAF search 830) to obtain new focus offset sample(s) 1055 for the focus offset map 1020 and/or other focus offset maps, to be input into the data store 1015 (e.g., into the focus offset map 1020 and/or other focus offset maps). The focus offset values in the cells of the focus offset map 1020 and/or other focus offset maps may be based on multiple focus offset value samples (e.g., mean, median, mode, maximum, or minimum) obtained in this way, thus training the model (e.g., the tree and the focus offset maps of the adaptive focus offset correction engine) based on the new focus offset sample(s) 1055. If, at the determination 1045, the adaptive focus offset correction engine identifies no further samples are required for the focus offset map 1020 and/or other focus offset maps, then no CDAF searches 1050 are required, and the adaptive focus offset correction engine can wait until the next PDAF trigger 1005 is received for the process to begin again.

In some examples, training of the model(s) of the adaptive focus offset correction engine may correspond to manufacturing, for instance performed during and/or after manufacturing of the image capture system. In some examples, training of the model(s) of the adaptive focus offset correction engine may be performed periodically (e.g., every day, every week, every month, etc.) to ensure that the training of the model(s) of the adaptive focus offset correction engine functions well even as wear and tear, and other changes, affect the image capture device differently over time.

Figure 11:
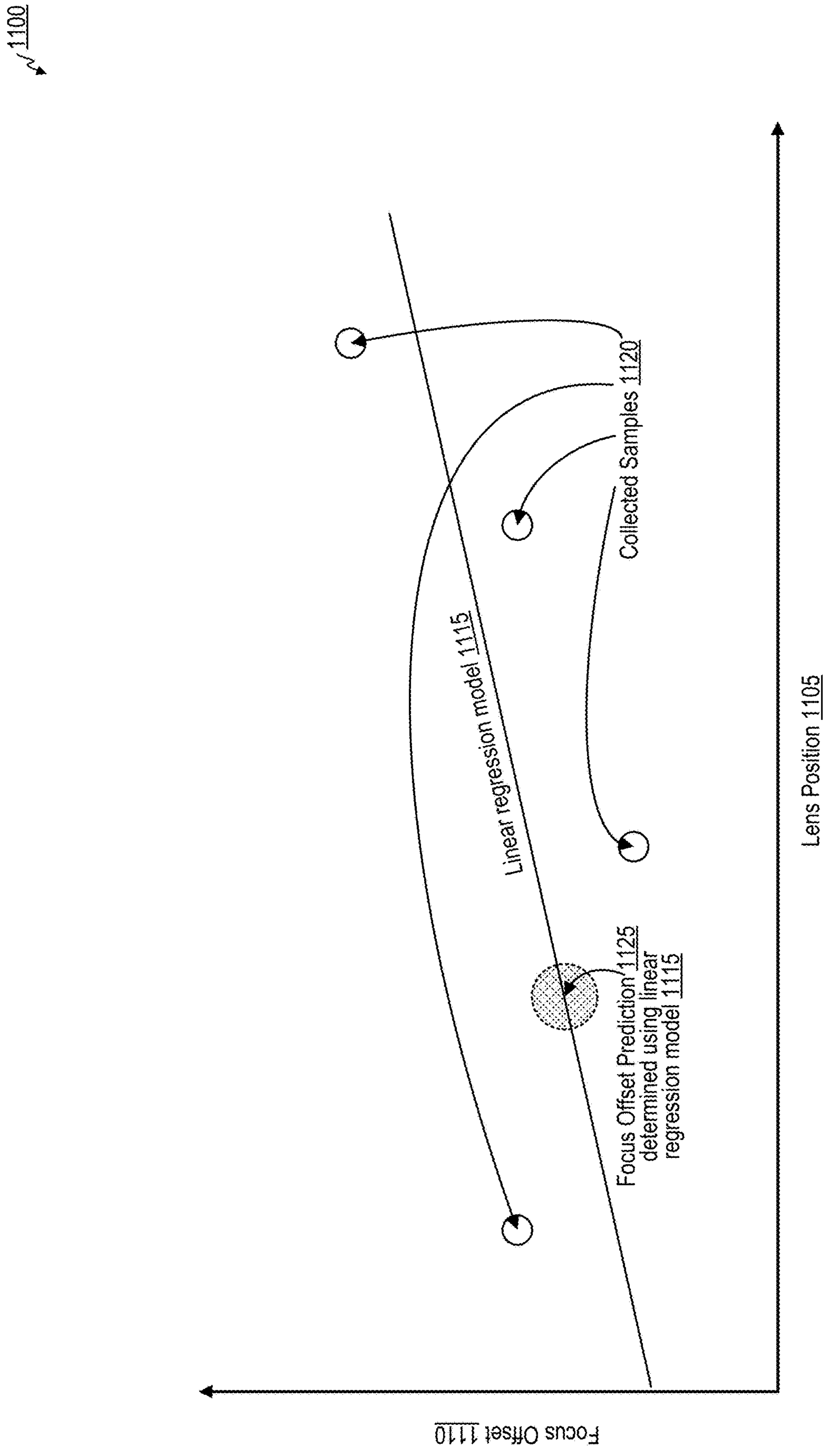
FIG. 11 is a graph illustrating a linear regression model used by the adaptive focus offset correction engine to predict a focus offset, in accordance with some examples.

FIG. 11 is a graph 1100 illustrating a linear regression model 1115 used by the adaptive focus offset correction engine to predict a focus offset. The graph 1100 plots collected samples 1120 collected via CDAF search(es) 1050 (e.g., new focus offset sample(s) 1055) on a plane. A horizontal axis for the plane measures lens position 1105, similarly to the lens position 410 in the CDAF graph 400, the lens position 515 in the focus offset graph 500, and the lens position 615 in the focus offset graphs 600A-600B. A vertical axis for the plane measures focus offset 1110, similarly to the focus offset 730 in the graphs 700C-700D. In some examples, lens position 1105 can be a proxy for distance between the image capture system and the subject (e.g., between the image sensor 220 and the subject 205), since lens position 1105 changes based on this distance.

The adaptive focus offset correction engine generates a linear regression model 1115 as a linear regression of the collected samples 1120 collected via CDAF search(es) 1050. Upon receipt of a query (e.g., query 905, query 1010), the adaptive focus offset correction engine can determine an appropriate focus offset corresponding to the query by determining a focus offset prediction 1125 along the linear regression model 1115 and corresponding to the lens position 1105 in the query. In some examples, an offset map may store a model in each cell, such as the linear regression model 1115 based on collected samples 1120 for that cell, rather than a single focus offset value. In some examples, training model(s) of the adaptive focus offset correction engine includes gathering and plotting collected samples 1120, and generating the corresponding model (e.g., linear regression model 1115).

In some examples, the adaptive focus offset correction engine can generate other models fit to collected samples 1120, rather than a linear regression model 1115 as in FIG. 11. For example, the adaptive focus offset correction engine can generate a linear regression model, a logarithmic regression model, a ridge regression model, a polynomial regression model, or a combination thereof.

Figure 12:
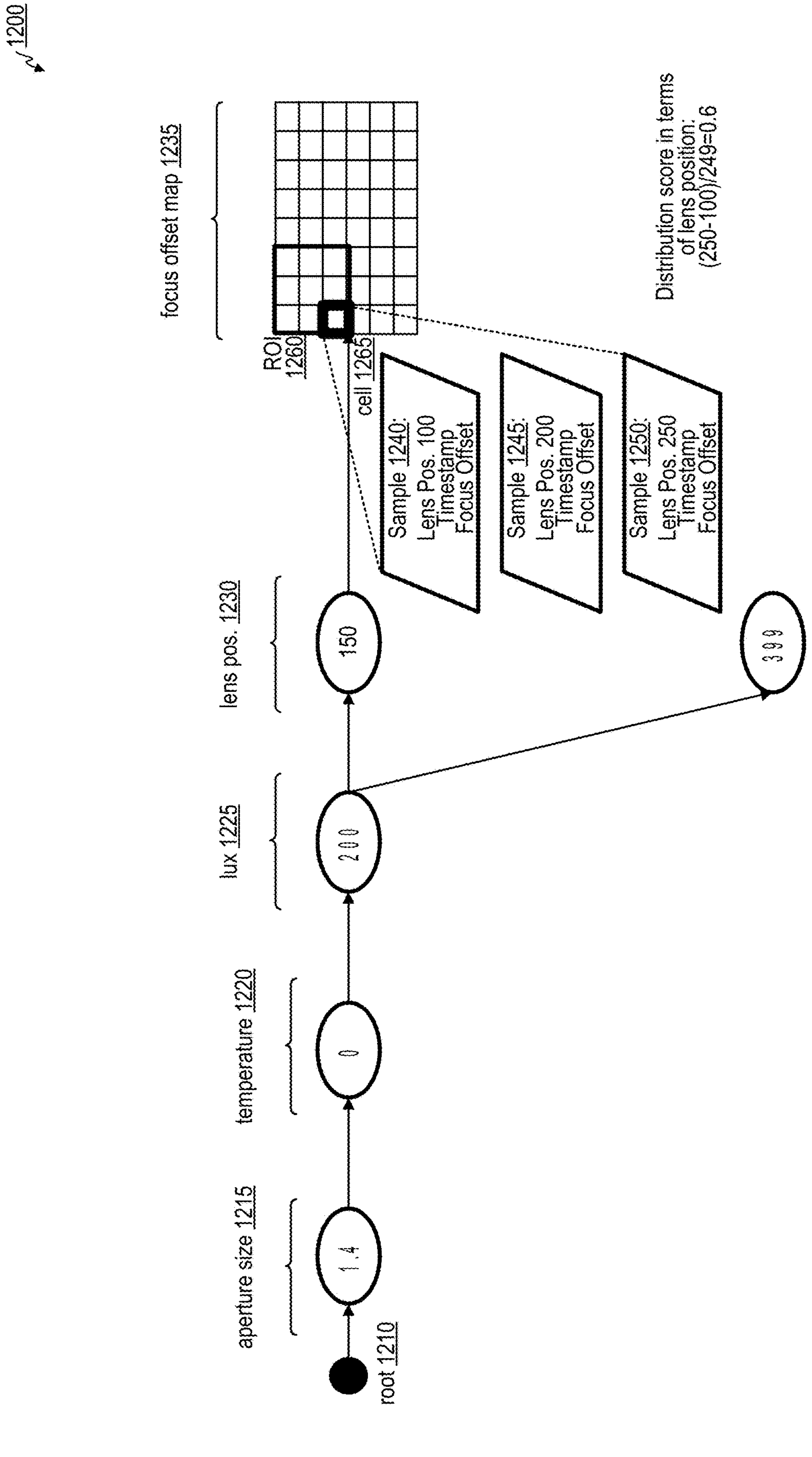
FIG. 12 is a tree diagram illustrating a process for a determination of whether a region of interest is valid for the adaptive focus offset correction engine, in accordance with some examples.

FIG. 12 is a tree diagram 1200 illustrating a process for a determination 1025 of whether a region of interest is valid for the adaptive focus offset correction engine. Similarly to the tree diagram 900 of FIG. 9, the tree diagram 1200 of FIG. 12 begins with a root 1210 and proceeds through various nodes that are children of the root 1210 and that in some cases form branches in the tree. In particular, the tree diagram 1200 proceeds from the root 1210 to a node for aperture size 1215 where an aperture size of 1.4 is selected based on a query (e.g., query 905, query 1010). Other branching nodes for aperture size 1215 may exist in the tree, but are not illustrated in FIG. 12 to keep the tree diagram 1200 clear and easy to read. The tree diagram 1200 proceeds to a node for temperature 1220 where a temperature value of 0 is selected based on the query (e.g., query 905, query 1010). Other branching nodes for temperature 1220 may exist in the tree, but are not illustrated in FIG. 12 to keep the tree diagram 1200 clear and easy to read. The tree diagram 1200 proceeds to a node for lux 1225 where a lux value of 200 is selected based on the query (e.g., query 905, query 1010). Other branching nodes for lux 1225 may exist in the tree, but are not illustrated in FIG. 12 to keep the tree diagram 1200 clear and easy to read. The tree diagram 1200 proceeds to branching nodes for lens position 1230 with values of 150 and 399. A lens position value of 150 is selected from the branching nodes for lens position 1230 based on the query (e.g., query 905, query 1010), and a focus offset map 1235 is illustrated corresponding to the lens position value of 100. A 3 pixel by 3 pixel ROI 1260 is illustrated in the upper-left corner of the focus offset map 1235 using a thick black outline. The position and dimensions of the ROI 1260 may be identified in the query (e.g., query 905, query 1010), for instance based on the position of the subject (e.g., subject 205) in the image frame.

In some examples, for the determination 1025, the adaptive focus offset correction engine can determine that an ROI 1260 is invalid when at least one of the grid cells in the ROI 1260 includes fewer than a threshold amount of samples. The threshold amount of samples can be one sample, two samples, or an amount higher than two of samples.

In some examples, for the determination 1025, the adaptive focus offset correction engine can determine that an ROI 1260 is invalid when a distribution score for at least one of the grid cells in the ROI 1260 is less than a minimum distribution score threshold. Distribution score can be calculated based on the width of the distribution of possible lens position values in the branching nodes for lens position 1230, as well as the width of the distribution of lens position values for the samples for the grid cell in question. For example, a particular grid cell 1265 in the ROI 1260 is highlighted in an even thicker black outline than the thick black outline indicating the ROI 1260. A first sample 1240 includes a focus offset value, timestamp, and lens position of 100. A second sample 1245 includes a focus offset value, timestamp, and lens position of 200. A third sample 1250 includes a focus offset value, timestamp, and lens position of 250. The distribution score can be calculated to be (250-100)/(399-150)=150/249=0.6. In some examples, the minimum distribution score threshold can be 0.1, 0.2, 0.3, 0.4, 0.5, and so forth.

In some examples, for the determination 1025, the adaptive focus offset correction engine can determine that an ROI 1260 is invalid when at least one of the grid cells in the ROI 1260 relies on samples that are stale beyond a threshold. For example, for the grid cell 1265, the first sample 1240, the second sample 1245, and the third sample 1250 each include timestamps. In some examples, if a delta of the timestamps of these samples is greater than a staleness threshold, then the samples for the grid cell 1265 are stale, and the adaptive focus offset correction engine can determine that the ROI 1260 is invalid. In some examples, if any of the timestamps of these samples is older than a staleness threshold, then the samples for the grid cell 1265 are stale, and the adaptive focus offset correction engine can determine that the ROI 1260 is invalid. In some examples, the staleness threshold can be one or more hours, one or more days, one or more weeks, one or more months, one or more years, and the like. Thus, the adaptive focus offset correction engine can retrain the model according to a schedule to avoid staleness, and/or as the samples start to become stale.

In some examples, for the determination 1025, if the adaptive focus offset correction engine does not find any of the invalidity conditions listed above to be true for an ROI 1260, then the ROI 1260 is valid for the determination 1025.

Figure 13:
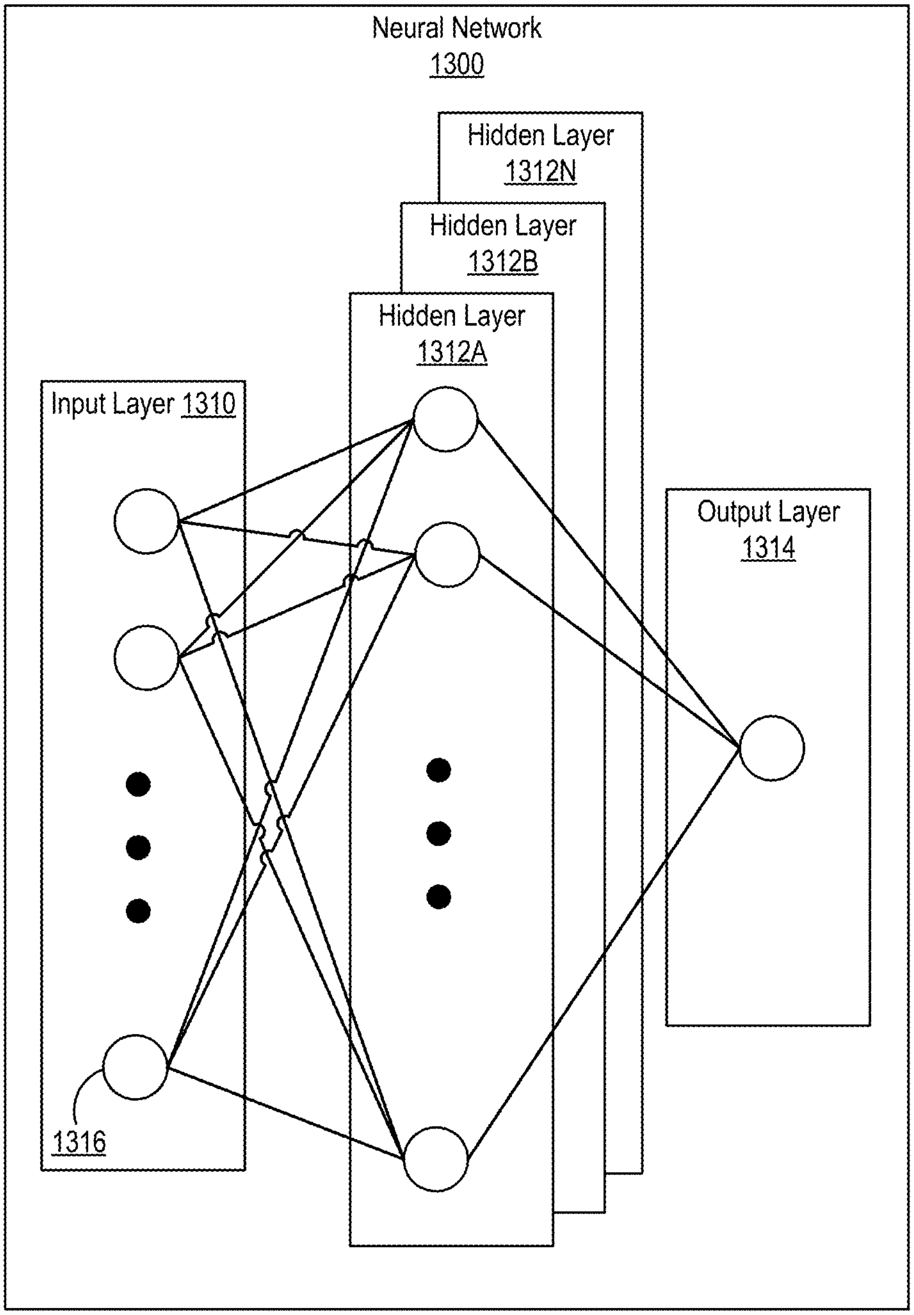
FIG. 13 is a block diagram illustrating an example of a neural network that can be used for the adaptive focus offset correction operations, in accordance with some examples.

FIG. 13 is a block diagram illustrating an example of a neural network (NN) 1300 that can be used for the adaptive focus offset correction operations. The neural network 1300 can include any type of deep network, such as a convolutional neural network (CNN), an autoencoder, a deep belief net (DBN), a Recurrent Neural Network (RNN), a Generative Adversarial Networks (GAN), and/or other type of neural network. In some examples, the adaptive focus offset correction engine includes, trains, and/or uses the neural network 1300 as a trained model for determining a focus offset based on image capture settings, such as those provided in the query 905, the query 1010, other image capture settings identified herein, or a combination thereof.

An input layer 1310 of the neural network 1300 includes input data. The input data of the input layer 1310 can include data representing image capture settings, such as those provided in the query 905, the query 1010, other image capture settings identified herein, or a combination thereof.

The neural network 1300 includes multiple hidden layers 1312A, 1312B, through 1312N. The hidden layers 1312A, 1312B, through 1312N include "N" number of hidden layers, where "N" is an integer greater than or equal to one. The number of hidden layers can be made to include as many layers as needed for the given application. The neural network 1300 further includes an output layer 1314 that provides an output resulting from the processing performed by the hidden layers 1312A, 1312B, through 1312N.

In some examples, the output layer 1314 can provide a focus offset map, such as the focus offset map 700B, the focus offset maps 940, the focus offset map 1020, or the focus offset map 1235. In some examples, the output layer 1314 can provide a focus offset value, such as the focus offset 425, the focus offset 435, focus offset 530, focus offset 630A, focus offset 630B, focus offset 730, a focus offset identified in the focus offset map 700B, a focus offset identified in the focus offset maps 940, a focus offset identified in the focus offset map 1020, the focus offset prediction 1125, a focus offset identified in the focus offset map 1235, the focus offset determined in operation 1415, or a combination thereof.

The neural network 1300 is a multi-layer neural network of interconnected filters. Each filter can be trained to learn a feature representative of the input data. Information associated with the filters is shared among the different layers and each layer retains information as information is processed. In some cases, the neural network 1300 can include a feed-forward network, in which case there are no feedback connections where outputs of the network are fed back into itself. In some cases, the network 1300 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1310 can activate a set of nodes in the first hidden layer 1312A. For example, as shown, each of the input nodes of the input layer 1310 can be connected to each of the nodes of the first hidden layer 1312A. The nodes of a hidden layer can transform the information of each input node by applying activation functions (e.g., filters) to this information. The information derived from the transformation can then be passed to and can activate the nodes of the next hidden layer 1312B, which can perform their own designated functions. Example functions include convolutional functions, downscaling, upscaling, data transformation, and/or any other suitable functions. The output of the hidden layer 1312B can then activate nodes of the next hidden layer, and so on. The output of the last hidden layer 1312N can activate one or more nodes of the output layer 1314, which provides a processed output image. In some cases, while nodes (e.g., node 1316) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1310 using the different hidden layers 1312A, 1312B, through 1312N in order to provide the output through the output layer 1314. In some examples, the neural network 1300 is trained using training data with samples of focus offsets determined using CDAF search(es) 1050, such as the new focus offset samples 1055, the collected samples 1120, the first sample 1240, the second sample 1245, the third sample 1250, other samples described herein, or a combination thereof.

Figure 14:
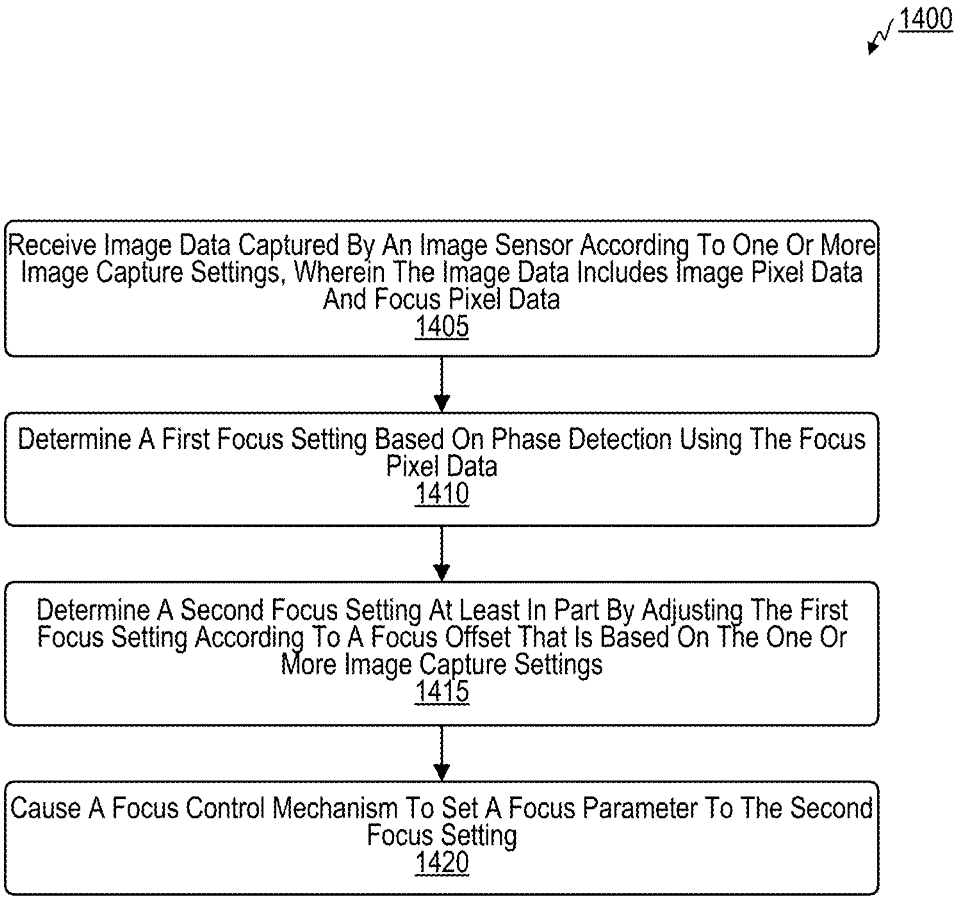
FIG. 14 is a flow diagram illustrating an imaging process, in accordance with some examples.

FIG. 14 is a flow diagram illustrating an imaging process 1400. The imaging process 1400 may be performed by an imaging system. In some examples, the imaging system can include, for example, the image capture and processing system 100, the image capture device 105A, the image processing device 105B, the image processor 150, the ISP 154, the host processor 152, the image capture system of FIGS. 2A-2C, an image capture system that includes the focus pixel 300, an image capture system that includes the focus pixel arrangement 340, an image capture system from which samples are obtained for the CDAF graph 400, an image capture system from which samples are obtained for the focus offset graph 500, an image capture system from which samples are obtained for the focus offset graph 600A, an image capture system from which samples are obtained for the focus offset graph 600B, an image capture system from which samples are obtained for the table 700A, an image capture system from which samples are obtained for the focus offset map 700B, the camera module A of the graph 700C, the camera module B of the graph 700C, the camera module C of the graph 700C, the 2PD camera of the graph 700D, the 8PD camera of the graph 700D, the 12PD camera of the graph 700D, the imaging system 800, the image capture subsystem 805, the image processing subsystem 810, the imaging system 850, the image processing subsystem 860, the adaptive focus offset correction engine of FIG. 9, the adaptive focus offset correction engine of FIG. 10, the data store 1015, the adaptive focus offset correction engine of FIG. 11, the adaptive focus offset correction engine of FIG. 12, the neural network 1300, the computing system 1500, the processor 1510, or a combination thereof.

At operation 1405, the imaging system is configured to, and can, receive image data captured by an image sensor according to one or more image capture settings. The image data includes focus pixel data. In some examples, the focus pixel data is captured using focus pixels of the image sensor, such as the focus pixels of the image sensor 220, the focus pixel 300, the focus pixel(s) of the focus pixel arrangement 340, or a combination thereof. In some examples, the image data also includes image pixel data in addition to the focus pixel data. In some examples, the image pixel data is captured using image pixels of the image sensor. In some examples, at least some of the image pixels and at least some of the focus pixels are distinct and/or different from one another. In some examples, at least some of the focus pixels may also function as image pixels. For instance, focus pixel data from a focus pixel can be processed (e.g., based on interpolation based on image pixel data from image pixels adjacent to the focus pixel) and used as image pixel data in an image captured by the image sensor.

In some examples, the imaging system includes an image sensor connector that coupled and/or connects the image sensor to a remainder of the imaging system (e.g., including the processor and/or the memory of the imaging system), In some examples, the imaging system receives the image data from the image sensor by receiving the image data from, over, and/or using the image sensor connector. Examples of the image sensor includes the image sensor 130, the image sensor 220, an image sensor that includes the focus pixel 300, an image sensor that includes the focus pixel arrangement 340, an image sensor corresponding to the CDAF graph 400, an image sensor corresponding to the focus offset graph 500, an image sensor corresponding to the focus offset graphs 600A-600B, an image sensor corresponding to the table 700A, an image sensor corresponding to the focus offset map 700B, an image sensor corresponding to the graph 700C, an image sensor corresponding to the graph 700D, an image sensor of the image capture subsystem 805, an image sensor whose image capture settings are identified in the query 905, an image sensor whose image capture settings are identified in the query 1010, an image sensor from which the new focus offset sample(s) 1055 are from, an image sensor from which the collected samples 1120 are from, an image sensor corresponding to the image capture settings of FIG. 12 (aperture size 1215, temperature 1220, lux 1225, lens position 1230, region of interest 1260), an image sensor that provides input image data to the, input layer 1310 of the NN 1300, the input device 1545, or a combination thereof. the input device 1545, another image sensor described herein, another sensor described herein, or a combination thereof.

Examples of the image data include image data captured using the image capture and processing system 100, image data captured using image sensor 220, the images 230A-230C, another image described herein, another set of image data described herein, or a combination thereof. Examples of the image capture settings include aperture size 915, aperture size 1215, temperature 920, temperature 1220, lux 705, lux 925, lux 1225, lens position 930, lens position 1230, region of interest as in the focus offset map 700B, region of interest 935, region of interest 1260, camera module hardware (e.g., as in the graph 700C), distance 735, exposure (e.g., as in the one or more exposure control mechanisms 125A), focus (e.g., as in the one or more focus control mechanisms 125B), zoom (e.g., as in the one or more zoom control mechanisms 125C), white balance, black balance, gamma, tone, analog gain, digital gain, rescaling, cropping, any other image capture setting(s) discussed herein, or a combination thereof.

At operation 1410, the imaging system is configured to, and can, determine a first focus setting based on phase detection using the focus pixel data. Examples of the focus pixel data includes the images 230A-230C, the distributions 225A-225C, focus pixel data captured by the PD photodiode 320A of the focus pixel 300, focus pixel data captured by the PD photodiode 320B and/or the PD photodiode 320C of the focus pixel arrangement 340, values along the PD curve 505, the PD value 520, values along the PD curves 605A-605B, the PD value 620, the PD value 715, focus pixel data used in the PDAF search 825, focus pixel data used in the PDAF search 1030, or a combination thereof. Examples of the first focus setting can include, for instance, the lens position 215B, a focus setting determined using focus pixel data from the PD photodiode 320A of the focus pixel 300, a focus setting determined using focus pixel data from the PD photodiode 320B and/or the PD photodiode 320C of the focus pixel arrangement 340, a lens position corresponding to the sub-optimal focus 420, a lens position corresponding to the sub-optimal focus 430, a lens position corresponding to the best focus 440, a value for lens position 515 at which the PD curve 505 is zero (or within a threshold range of zero), a value for lens position 615 at which the PD curve 605A is zero (or within a threshold range of zero), a value for lens position 615 at which the PD curve 605B is zero (or within a threshold range of zero), a lens position at which the PD value 715 is zero (or within a threshold range of zero), a focus setting determined using the PDAF search 825, a focus setting determined using the PDAF search 1030, a focus setting determined using the PDAF search 1030 with standardized focus offset 1035, another focus setting described herein as determined using PDAF, or a combination thereof.

In some examples, determining the first focus setting based on phase detection using the focus pixel data includes identifying a phase difference between a first focus dataset of the focus pixel data and a second focus dataset of the focus pixel data. The first focus dataset is associated with a first focus pixel of the image sensor. The second focus dataset is associated with a second focus pixel of the image sensor. Examples of the first focus dataset and/or the second focus dataset include any of the examples discussed above with respect to the examples of the focus pixel data. The first focus dataset and the second focus dataset may be distinct and/or different from one another. The first focus pixel and the second focus pixel may be distinct and/or different from one another. In some examples, the first focus pixel may refer to the PD photodiode 320B and the first focus dataset may refer to focus data captured by the PD photodiode 320B, while the second focus pixel may refer to the PD photodiode 320C and the second focus dataset may refer to focus data captured by the PD photodiode 320C, or vice versa. Examples of the phase difference can include any of the examples discussed above with respect to the examples of the focus pixel data, for instance including the phase difference in the distribution 225A, the phase difference in the distribution 225B, various values for PD value 520 along the PD curve 505, various values for PD value 620 along the PD curves 605A-605B, the PD value 715, focus pixel data used in the PDAF search 825, focus pixel data used in the PDAF search 1030, or some combinations thereof.

At operation 1415, the imaging system is configured to, and can, determine a second focus setting at least in part by adjusting the first focus setting according to a focus offset that is based the one or more image capture settings. Examples of the focus offset include focus offset 425, focus offset 435, focus offset 530, focus offset 630A, focus offset 630B, a focus offset determined using the focus offset map 700B, focus offset 730, a focus offset determined using the adaptive focus offset correction 870, a focus offset determined using the focus offset map(s) 940, a focus offset determined using the focus offset map 1020, a standardized focus offset 1035, a focus offset determined using adaptive focus offset 1040, focus offset 1110 values of the collected samples 1120, the focus offset prediction 1125, a focus offset determined using the focus offset map 1235, a focus offset determined using the NN 1300, or a combination thereof. Examples of the In some examples, the imaging system is configured to, and can, determine the focus offset based on use of the one or more image capture settings as inputs to a trained model. In some examples the trained model includes one or more trained machine learning models, one or more NNs (e.g., NN 1300), one or more CNNs) one or more TDNNs, one or more deep networks, one or more autoencoders, one or more DBNs, one or more RNNs, one or more GANs, one or more cGANs, one or more other types of NNs, one or more trained SVMs, one or more trained RFs, one or more computer vision systems, one or more deep learning systems, or combinations thereof. In some examples, the trained model includes focus offset maps that include respective focus offsets corresponding to different regions of interest to focus on. Examples of the focus offset maps include the focus offset map 700B, a focus offset map generated using and/or used by the adaptive focus offset correction 870, the focus offset map(s) 940, the focus offset map 1020, the focus offset map 1235, or a combination thereof. In some examples, the trained model includes a linear regression, such as the linear regression model 1115. In some examples, the trained model includes a linear regression model, a logarithmic regression model, a ridge regression model, a polynomial regression model, or a combination thereof. In some examples, the trained model includes a decision tree and/or a random forest, such as the tree/forest in the tree diagram 900 or the tree/forest in the tree diagram 1200. In some examples, the imaging system is configured to, and can, periodically retrain the trained model according to a schedule (e.g., every one or more hours, every one or more days, every one or more weeks, every one or more months, every one or more years, or a combination thereof).

In some examples, the trained model is trained using training data that indicates one or more respective differences between one or more phase detection autofocus (PDAF) focus settings that are determined using PDAF and one or more corresponding contrast detection autofocus (CDAF) focus settings that are determined using CDAF with the one or more PDAF focus settings as respective starting points. In some examples, the trained model is trained using training data that is generated based on prior focus settings for the focus control mechanism that are determined based on prior image capture settings for image capture using the image sensor. For instance, the training data can include PDAF data, CDAF data, and/or differences between, such as the images 230A-230C, the distributions 225A-225C, focus pixel data captured by the PD photodiode 320A of the focus pixel 300, focus pixel data captured by the PD photodiode 320B and/or the PD photodiode 320C of the focus pixel arrangement 340, values along the CDAF curve 405, the sub-optimal focus 420, the sub-optimal focus 430, the best focus 440, values of PD value 520 along the PD curve 505, values of focus value 525 along the focus value curve 510, the focus offset 530, values of PD value 620 along the PD curve 605A, values of focus value 625 along the focus value curve 610A, the focus offset 630A, values of PD value 620 along the PD curve 605B, values of focus value 625 along the focus value curve 610B, the focus offset 630B, the lens position 710 after CDAF, the PD value 715 at the lens position 710, the defocus value 720 at the lens position 710, the focus offset map 700B, the focus offset 730, the distance 735, focus settings generated using the PDAF search 825, focus settings generated using the CDAF search 830, focus settings generated (or to be generated) using the adaptive focus offset correction 870, the focus offset maps(s) 940, focus settings generated using the PDAF search 1030, focus settings generated using the CDAF search 1050, focus settings generated using the standardized focus offset 1035, focus settings generated (or to be generated using the adaptive focus offset 1040), the focus offset maps(s) 1020, the new focus offset sample(s) 1055, the collected samples 1120, the focus offset prediction 1125, the focus offset map 1235, the sample 1240, the sample 1245, the sample 1250, or a combination thereof.

At operation 1420, the imaging system is configured to, and can, cause a focus control mechanism to set a focus parameter to the second focus setting. Examples of the focus control mechanism include the one or more focus control mechanisms 125B, the linear actuator 240, a focus control mechanisms of the image capture subsystem 805, or a combination thereof.

In some examples, the one or more image capture settings include a third focus setting that is distinct from the second focus setting, and causing the focus control mechanism to set the focus parameter to the second focus setting includes causing the focus control mechanism to adjust the focus parameter from the third focus setting to the second focus setting. Examples of the third focus setting can include, for instance, the lens position 215B, a focus setting determined using focus pixel data from the PD photodiode 320A of the focus pixel 300, a focus setting determined using focus pixel data from the PD photodiode 320B and/or the PD photodiode 320C of the focus pixel arrangement 340, a lens position corresponding to the sub-optimal focus 420, a lens position corresponding to the sub-optimal focus 430, a lens position corresponding to the best focus 440, a value for lens position 515 at which the PD curve 505 is zero (or within a threshold range of zero), a value for lens position 615 at which the PD curve 605A is zero (or within a threshold range of zero), a value for lens position 615 at which the PD curve 605B is zero (or within a threshold range of zero), a lens position at which the PD value 715 is zero (or within a threshold range of zero), a focus setting determined using the PDAF search 825, a focus setting determined using the PDAF search 1030, a focus setting determined using the PDAF search 1030 with standardized focus offset 1035, another focus setting described herein as determined using PDAF, or a combination thereof.

In some examples, causing the focus control mechanism to set the focus parameter to the second focus setting includes causing actuation of a linear actuator of the focus control mechanism to move a lens from a first lens position to a second lens position that corresponds to the second focus setting. The image data is captured based on light passing through the lens and reaching the image sensor. Examples of the lens include the lens 115, the lens 210, another lens discussed herein, or a combination thereof. Examples of a linear actuator include the linear actuator 240 and/or another linear actuator of the one or more focus control mechanisms 125B. In some examples, the linear actuator includes a voice coil motor (VCM). For instance, the actuation of a linear actuator can effect a movement of the lens 210 between any two of the lens positions 215A-215C, a movement between any two lens positions along the CDAF curve 405, the movement 535, the movement 635A, the movement 635B, another lens movement discussed herein, or a combination thereof. In some examples, causing the focus control mechanism to set the focus parameter to the second focus setting includes causing actuation of a linear actuator of the focus control mechanism to move a lens in a direction that is perpendicular to an image plane of the image sensor. For example, the linear actuator 240 moves the lens 210 in a direction (left and/or right in FIGS. 2A-2C) that is perpendicular to an image plane of the image sensor 220 of FIGS. 2A-2C.

In some examples, imaging system is configured to, and can, receive secondary image data captured by the image sensor according to the second focus setting. In some examples, the imaging system is configured to, and can, output the secondary image data. In some examples, the imaging system includes a display interface. To output the secondary image data, the one or more processors are configured to cause the secondary image data to be displayed using a display at least in part by sending the secondary image data to the display through the display interface. Examples of the display include the I/O 156, the I/O 160, and/or the output device 1535. Examples of the display interface include the I/O 156, the I/O 160, and/or the connection 1505. In some examples, the imaging system includes the display. In some examples, the imaging system includes a communication interface. To output the secondary image data, the imaging system is configured to send the secondary image data to a recipient device using the communication interface. Examples of the communication interface include the output device 1535 and/or the communication interface 1540.

In some examples, the imaging system can includes: means for receiving image data captured by an image sensor according to one or more image capture settings, wherein the image data includes focus pixel data; means for determining a first focus setting based on phase detection using the focus pixel data; means for determining a second focus setting at least in part by adjusting the first focus setting according to a focus offset that is based on the one or more image capture settings; and means for causing a focus control mechanism to set a focus parameter to the second focus setting.

In some examples, the means for receiving the image data includes the image capture and processing system 100, the image capture device 105A, the image processing device 105B, the image processor 150, the ISP 154, the host processor 152, the image sensor 130, the image sensor 220, an image sensor that includes the focus pixel 300, an image sensor that includes the focus pixel arrangement 340, an image sensor corresponding to the CDAF graph 400, an image sensor corresponding to the focus offset graph 500, an image sensor corresponding to the focus offset graphs 600A-600B, an image sensor corresponding to the table 700A, an image sensor corresponding to the focus offset map 700B, an image sensor corresponding to the graph 700C, an image sensor corresponding to the graph 700D, an image sensor of the image capture subsystem 805, an image sensor whose image capture settings are identified in the query 905, an image sensor whose image capture settings are identified in the query 1010, an image sensor from which the new focus offset sample(s) 1055 are from, an image sensor from which the collected samples 1120 are from, an image sensor corresponding to the image capture settings of FIG. 12 (aperture size 1215, temperature 1220, lux 1225, lens position 1230, region of interest 1260), an image sensor that provides input image data to the, input layer 1310 of the NN 1300, the input device 1545, or a combination thereof.

In some examples, the means for determining the first focus setting based on phase detection includes the image capture and processing system 100, the image processing device 105B, the image processor 150, the ISP 154, the host processor 152, the image capture system of FIGS. 2A-2C, an image capture system that includes the focus pixel 300, an image capture system that includes the focus pixel arrangement 340, an image capture system from which samples are obtained for the focus offset graph 500, an image capture system from which samples are obtained for the focus offset graph 600A, an image capture system from which samples are obtained for the focus offset graph 600B, an image capture system from which samples are obtained for the table 700A, an image capture system from which samples are obtained for the focus offset map 700B, the camera module A of the graph 700C, the camera module B of the graph 700C, the camera module C of the graph 700C, the 2PD camera of the graph 700D, the 8PD camera of the graph 700D, the 12PD camera of the graph 700D, the imaging system 800, the image capture subsystem 805, the image processing subsystem 810, the imaging system 850, the image processing subsystem 860, the adaptive focus offset correction engine of FIG. 9, the adaptive focus offset correction engine of FIG. 10, the data store 1015, the adaptive focus offset correction engine of FIG. 11, the adaptive focus offset correction engine of FIG. 12, the neural network 1300, the computing system 1500, the processor 1510, or a combination thereof.

In some examples, the means for determining the second focus setting includes the image capture and processing system 100, the image capture device 105A, the image processing device 105B, the image processor 150, the ISP 154, the host processor 152, the image capture system of FIGS. 2A-2C, an image capture system that includes the focus pixel 300, an image capture system that includes the focus pixel arrangement 340, an image capture system from which samples are obtained for the CDAF graph 400, an image capture system from which samples are obtained for the focus offset graph 500, an image capture system from which samples are obtained for the focus offset graph 600A, an image capture system from which samples are obtained for the focus offset graph 600B, an image capture system from which samples are obtained for the table 700A, an image capture system from which samples are obtained for the focus offset map 700B, the camera module A of the graph 700C, the camera module B of the graph 700C, the camera module C of the graph 700C, the 2PD camera of the graph 700D, the 8PD camera of the graph 700D, the 12PD camera of the graph 700D, the imaging system 800, the image capture subsystem 805, the image processing subsystem 810, the imaging system 850, the image processing subsystem 860, the adaptive focus offset correction engine of FIG. 9, the adaptive focus offset correction engine of FIG. 10, the data store 1015, the adaptive focus offset correction engine of FIG. 11, the adaptive focus offset correction engine of FIG. 12, the neural network 1300, the computing system 1500, the processor 1510, or a combination thereof In some examples, the means for causing the focus control mechanism to set the focus parameter to the second focus setting includes the focus control mechanism include the one or more focus control mechanisms 125B, the linear actuator 240, a focus control mechanisms of the image capture subsystem 805, or a combination thereof.

In some examples, the processes described herein (e.g., the processes of FIG. 1, FIGS. 2A-2C, 3A-3B, 4, 5, 6A-6B, 7A-7D, 8A-8B, 9, 10, 11, 12, 13, the process 1400 of FIG. 14, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the image capture system of FIGS. 2A-2C, an image capture system that includes the focus pixel 300, an image capture system that includes the focus pixel arrangement 340, an image capture system from which samples are obtained for the CDAF graph 400, an image capture system from which samples are obtained for the focus offset graph 500, an image capture system from which samples are obtained for the focus offset graph 600A, an image capture system from which samples are obtained for the focus offset graph 600B, an image capture system from which samples are obtained for the table 700A, an image capture system from which samples are obtained for the focus offset map 700B, the camera module A of the graph 700C, the camera module B of the graph 700C, the camera module C of the graph 700C, the 2PD camera of the graph 700D, the 8PD camera of the graph 700D, the 12PD camera of the graph 700D, the imaging system 800, the image capture subsystem 805, the image processing subsystem 810, the imaging system 850, the image processing subsystem 860, the adaptive focus offset correction engine of FIG. 9, the adaptive focus offset correction engine of FIG. 10, the data store 1015, the adaptive focus offset correction engine of FIG. 11, the adaptive focus offset correction engine of FIG. 12, the neural network 1300, the computing system 1500, the processor 1510, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
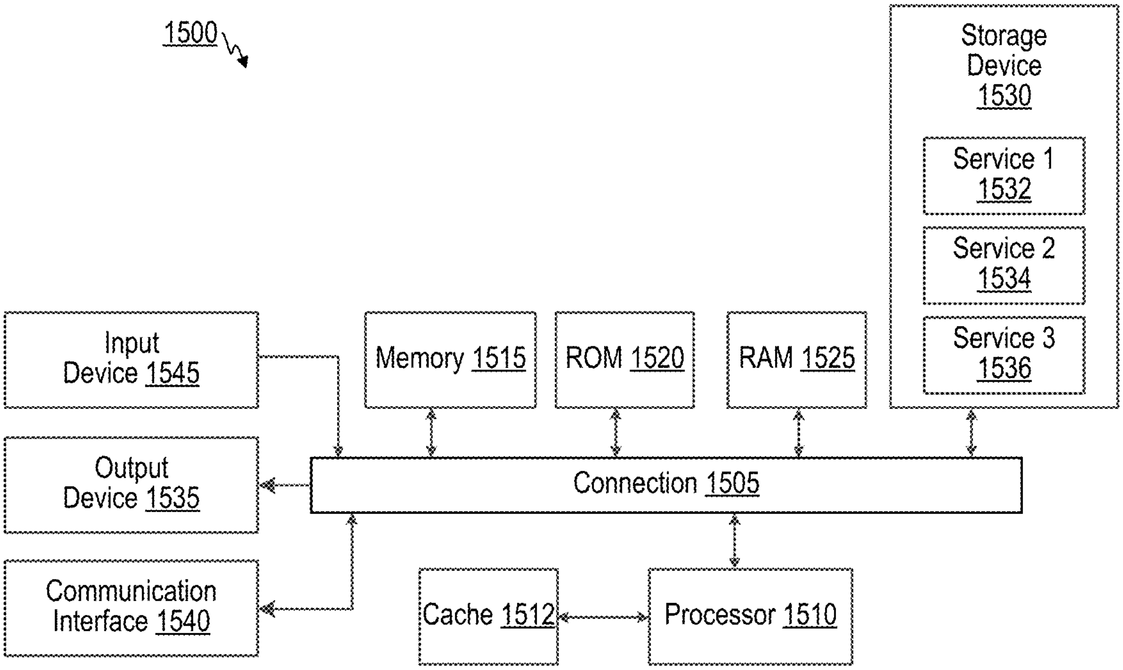
FIG. 15 is a diagram illustrating an example of a computing system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei- Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: receive image data captured by an image sensor according to one or more image capture settings, wherein the image data includes focus pixel data; determine a first focus setting based on phase detection using the focus pixel data; determine a second focus setting at least in part by adjusting the first focus setting according to a focus offset that is based on the one or more image capture settings; and cause a focus control mechanism to set a focus parameter to the second focus setting.

Aspect 2. The apparatus of Aspect 1, wherein the one or more processors are configured to: determine the focus offset based on use of the one or more image capture settings as inputs to a trained model.

Aspect 3. The apparatus of Aspect 2, wherein the trained model includes focus offset maps that include respective focus offsets corresponding to different regions of interest to focus on.

Aspect 4. The apparatus of any of Aspects 2 to 3, wherein the trained model includes a linear regression.

Aspect 5. The apparatus of any of Aspects 2 to 4, wherein the trained model includes a decision tree.

Aspect 6. The apparatus of any of Aspects 2 to 5, wherein the one or more processors are configured to: periodically retrain the trained model according to a schedule.

Aspect 7. The apparatus of any of Aspects 2 to 6, wherein the trained model is trained using training data that indicates one or more respective differences between one or more phase detection autofocus (PDAF) focus settings that are determined using PDAF and one or more corresponding contrast detection autofocus (CDAF) focus settings that are determined using CDAF with the one or more PDAF focus settings as respective starting points.

Aspect 8. The apparatus of any of Aspects 2 to 7, wherein the trained model is trained using training data that is generated based on prior focus settings for the focus control mechanism that are determined by the one or more processors based on prior image capture settings for image capture using the image sensor.

Aspect 9. The apparatus of any of Aspects 1 to 8, wherein, to determine the first focus setting based on phase detection using the focus pixel data, the one or more processors are configured to identify a phase difference between a first focus dataset of the focus pixel data and a second focus dataset of the focus pixel data, wherein the first focus dataset is associated with a first focus pixel of the image sensor, wherein the second focus dataset is associated with a second focus pixel of the image sensor.

Aspect 10. The apparatus of any of Aspects 1 to 9, wherein the one or more image capture settings include a third focus setting that is distinct from the second focus setting, wherein, to cause the focus control mechanism to set the focus parameter to the second focus setting, the one or more processors are configured to cause the focus control mechanism to adjust the focus parameter from the third focus setting to the second focus setting.

Aspect 11. The apparatus of any of Aspects 1 to 10, wherein, to cause the focus control mechanism to set the focus parameter to the second focus setting, the one or more processors are configured to cause actuation of a linear actuator of the focus control mechanism to move a lens from a first lens position to a second lens position that corresponds to the second focus setting, wherein the image data is captured based on light passing through the lens and reaching the image sensor.

Aspect 12. The apparatus of any of Aspects 1 to 11, wherein, to cause the focus control mechanism to set the focus parameter to the second focus setting, the one or more processors are configured to cause actuation of a linear actuator of the focus control mechanism to move a lens in a direction that is perpendicular to an image plane of the image sensor.

Aspect 13. The apparatus of any of Aspects 1 to 12, wherein the one or more image capture settings include at least one of aperture size, temperature, lux, lens position, or region of interest.

Aspect 14. The apparatus of any of Aspects 1 to 13, wherein the one or more processors are configured to: receive secondary image data captured by the image sensor according to the second focus setting; and output the secondary image data.

Aspect 15. The apparatus of Aspect 14, further comprising: a display interface, wherein, to output the secondary image data, the one or more processors are configured to cause the secondary image data to be displayed using a display at least in part by sending the secondary image data to the display through the display interface.

Aspect 16. The apparatus of any of Aspects 14 to 15, further comprising: a communication interface, wherein, to output the secondary image data, the one or more processors are configured to send the secondary image data to a recipient device using the communication interface.

Aspect 17. A method for imaging, the method comprising: receiving image data captured by an image sensor according to one or more image capture settings, wherein the image data includes focus pixel data; determining a first focus setting based on phase detection using the focus pixel data; determining a second focus setting at least in part by adjusting the first focus setting according to a focus offset that is based on the one or more image capture settings; and causing a focus control mechanism to set a focus parameter to the second focus setting.

Aspect 18. The method of Aspect 17, further comprising: determining the focus offset based on use of the one or more image capture settings as inputs to a trained model.

Aspect 19. The method of Aspect 18, wherein the trained model includes focus offset maps that include respective focus offsets corresponding to different regions of interest to focus on.

Aspect 20. The method of any of Aspects 18 to 19, wherein the trained model includes a linear regression.

Aspect 21. The method of any of Aspects 18 to 20, wherein the trained model includes a decision tree.

Aspect 22. The method of any of Aspects 18 to 21, further comprising: periodically retraining the trained model according to a schedule.

Aspect 23. The method of any of Aspects 18 to 22, wherein the trained model is trained using training data that indicates one or more respective differences between one or more phase detection autofocus (PDAF) focus settings that are determined using PDAF and one or more corresponding contrast detection autofocus (CDAF) focus settings that are determined using CDAF with the one or more PDAF focus settings as respective starting points.

Aspect 24. The method of any of Aspects 18 to 23, wherein the trained model is trained using training data that is generated based on prior focus settings for the focus control mechanism that are determined based on prior image capture settings for image capture using the image sensor.

Aspect 25. The method of any of Aspects 17 to 24, wherein determining the first focus setting based on phase detection using the focus pixel data includes identifying a phase difference between a first focus dataset of the focus pixel data and a second focus dataset of the focus pixel data, wherein the first focus dataset is associated with a first focus pixel of the image sensor, wherein the second focus dataset is associated with a second focus pixel of the image sensor.

Aspect 26. The method of any of Aspects 17 to 25, wherein the one or more image capture settings include a third focus setting that is distinct from the second focus setting, wherein causing the focus control mechanism to set the focus parameter to the second focus setting includes causing the focus control mechanism to adjust the focus parameter from the third focus setting to the second focus setting.

Aspect 27. The method of any of Aspects 17 to 26, wherein causing the focus control mechanism to set the focus parameter to the second focus setting includes causing actuation of a linear actuator of the focus control mechanism to move a lens from a first lens position to a second lens position that corresponds to the second focus setting, wherein the image data is captured based on light passing through the lens and reaching the image sensor.

Aspect 28. The method of any of Aspects 17 to 27, wherein causing the focus control mechanism to set the focus parameter to the second focus setting includes causing actuation of a linear actuator of the focus control mechanism to move a lens in a direction that is perpendicular to an image plane of the image sensor.

Aspect 29. The method of any of Aspects 17 to 28, wherein the one or more image capture settings include at least one of aperture size, temperature, lux, lens position, or region of interest.

Aspect 30. The method of any of Aspects 17 to 29, further comprising: receiving secondary image data captured by the image sensor according to the second focus setting; and outputting the secondary image data.

Aspect 31. The method of Aspect 30, wherein outputting the secondary image data includes causing the secondary image data to be displayed using a display at least in part by sending the secondary image data to the display through a display interface.

Aspect 32. The method of any of Aspects 30 to 31, wherein outputting the secondary image data includes causing the secondary image data to be displayed using a display at least in part by sending the secondary image data to the display through a display interface.

Aspect 33: A non-transitory computer-readable medium having stored thereon instructions that, when executed by one or more processors, cause the one or more processors to: receive image data captured by an image sensor according to one or more image capture settings, wherein the image data includes focus pixel data; determine a first focus setting based on phase detection using the focus pixel data; determine a second focus setting at least in part by adjusting the first focus setting according to a focus offset that is based on the one or more image capture settings; and cause a focus control mechanism to set a focus parameter to the second focus setting.

Aspect 34: The non-transitory computer-readable medium of Aspect 33, further comprising operations according to any of Aspects 2 to 16, and/or any of Aspects 18 to 32.

Aspect 35: An apparatus for image processing, the apparatus comprising: means for receiving image data representing at least a portion of a first user as captured by a first image sensor; means for receiving image data captured by an image sensor according to one or more image capture settings, wherein the image data includes focus pixel data; means for determining a first focus setting based on phase detection using the focus pixel data; means for determining a second focus setting at least in part by adjusting the first focus setting according to a focus offset that is based on the one or more image capture settings; and means for causing a focus control mechanism to set a focus parameter to the second focus setting.

Aspect 36: The apparatus of Aspect 35, further comprising means for performing operations according to any of Aspects 2 to 16, and/or any of Aspects 18 to 32.

What is claimed is:

1. An apparatus for imaging, the apparatus comprising:
at least one memory; and
one or more processors coupled to the at least one memory, the one or more processors configured to:
receive image data captured by an image sensor according to one or more image capture settings, wherein the image data includes focus pixel data;
determine a first focus setting based on phase detection using the focus pixel data;
predict a focus offset between the first focus setting and a target focus setting based on the first focus setting, the one or more image capture settings, and a regression model, the regression model generated based on samples of previously-determined phase-based focus settings and previously-determined contrast-based focus settings corresponding to different image capture settings for the image sensor; and
cause a focus control mechanism to set a focus parameter to a second focus setting, wherein the second focus setting is based on application of the focus offset to the first focus setting.

2. The apparatus of claim 1, wherein, to predict the focus offset, the one or more processors are configured to:
process the first focus setting and the one or more image capture settings using the regression model to generate the focus offset.

3. The apparatus of claim 1, wherein, to predict the focus offset, the one or more processors are configured to:
process the first focus setting using at least one focus offset map and the regression model to generate the focus offset, wherein the at least one focus offset map includes respective focus offsets corresponding to different regions of interest in the image data.

4. The apparatus of claim 1, wherein the regression model includes a linear regression model.

5. The apparatus of claim 1, wherein, to predict the focus offset, the one or more processors are configured to:
process the first focus setting using a decision tree and the regression model to generate the focus offset.

6. The apparatus of claim 1, wherein the one or more processors are configured to:
update the regression model based on the focus offset.

7. The apparatus of claim 1, wherein the previously-determined phase-based focus settings are generated using phase detection autofocus (PDAF), and wherein the previously-determined contrast-based focus settings are generated using contrast detection autofocus (CDAF).

8. The apparatus of claim 1, wherein, to predict the focus offset, the one or more processors are configured to:
process the first focus setting and the one or more image capture settings using the regression model and a trained machine learning model to generate the focus offset, the trained machine learning model trained using training data that is generated based on prior focus settings for the focus control mechanism that are determined by the one or more processors based on prior image capture settings for image capture using the image sensor.

9. The apparatus of claim 1, wherein, to determine the first focus setting based on phase detection using the focus pixel data, the one or more processors are configured to identify a phase difference between a first focus dataset of the focus pixel data and a second focus dataset of the focus pixel data, wherein the first focus dataset is associated with a first focus pixel of the image sensor, wherein the second focus dataset is associated with a second focus pixel of the image sensor.

10. The apparatus of claim 1, wherein the one or more image capture settings include a third focus setting that is distinct from the first focus setting and the second focus setting, and wherein, to cause the focus control mechanism to set the focus parameter to the second focus setting, the one or more processors are configured to cause the focus control mechanism to adjust the focus parameter from the third focus setting to the second focus setting.

11. The apparatus of claim 1, wherein, to cause the focus control mechanism to set the focus parameter to the second focus setting, the one or more processors are configured to cause actuation of a linear actuator of the focus control mechanism to move a lens from a first lens position to a second lens position that corresponds to the second focus setting, wherein the image data is captured based on light passing through the lens and reaching the image sensor.

12. The apparatus of claim 1, wherein, to cause the focus control mechanism to set the focus parameter to the second focus setting, the one or more processors are configured to cause actuation of a linear actuator of the focus control mechanism to move a lens in a direction that is perpendicular to an image plane of the image sensor.

13. The apparatus of claim 1, wherein the one or more image capture settings include at least one of aperture size, temperature, lux, lens position, or region of interest.

14. The apparatus of claim 1, wherein the one or more processors are configured to:

receive secondary image data captured by the image sensor according to the second focus setting; and output the secondary image data.

15. The apparatus of claim 14, further comprising:

a display interface, wherein, to output the secondary image data, the one or more processors are configured to cause the secondary image data to be displayed using a display at least in part by sending the secondary image data to the display through the display interface.

16. The apparatus of claim 14, further comprising:

a communication interface, wherein, to output the secondary image data, the one or more processors are configured to send the secondary image data to a recipient device using the communication interface.

17. A method for imaging, the method comprising:

receiving image data captured by an image sensor according to one or more image capture settings, wherein the image data includes focus pixel data;

determining a first focus setting based on phase detection using the focus pixel data;

predicting a focus offset between the first focus setting and a target focus setting based on the first focus setting, the one or more image capture settings, and a regression model, the regression model generated based on samples of previously-determined phase-based focus settings and previously-determined contrast-based focus settings corresponding to different image capture settings for the image sensor; and causing a focus control mechanism to set a focus parameter to a second focus setting, wherein the second focus setting is based on application of the focus offset to the first focus setting.

18. The method of claim 17, wherein predicting the focus offset includes processing the first focus setting and the one or more image capture settings using the regression model to generate the focus offset.

19. The method of claim 17, wherein predicting the focus offset includes processing the first focus setting using at least one focus offset map and the regression model to generate the focus offset, wherein the at least one focus offset map includes respective focus offsets corresponding to different regions of interest in the image data.

20. The method of claim 17, wherein the regression model includes a linear regression model.

21. The method of claim 17, wherein predicting the focus offset includes processing the first focus setting using a decision tree and the regression model to generate the focus offset.

22. The method of claim 17, further comprising:

updating the regression model based on the focus offset.

23. The method of claim 17, wherein the previously-determined phase-based focus settings are generated using phase detection autofocus (PDAF), and wherein the previously-determined contrast-based focus settings are generated using contrast detection autofocus (CDAF).

24. The method of claim 17, wherein predicting the focus offset includes processing the first focus setting using the regression model and a trained machine learning model to generate the focus offset, the trained machine learning model trained using training data that is generated based on prior focus settings for the focus control mechanism that are determined based on prior image capture settings for image capture using the image sensor.

25. The method of claim 17, wherein determining the first focus setting based on phase detection using the focus pixel data includes identifying a phase difference between a first focus dataset of the focus pixel data and a second focus dataset of the focus pixel data, wherein the first focus dataset is associated with a first focus pixel of the image sensor, wherein the second focus dataset is associated with a second focus pixel of the image sensor.

26. The method of claim 17, wherein the one or more image capture settings include a third focus setting that is distinct from the first focus setting and the second focus setting, and wherein causing the focus control mechanism to set the focus parameter to the second focus setting includes causing the focus control mechanism to adjust the focus parameter from the third focus setting to the second focus setting.

27. The method of claim 17, wherein causing the focus control mechanism to set the focus parameter to the second focus setting includes causing actuation of a linear actuator of the focus control mechanism to move a lens from a first lens position to a second lens position that corresponds to the second focus setting, wherein the image data is captured based on light passing through the lens and reaching the image sensor.

28. The method of claim 17, wherein causing the focus control mechanism to set the focus parameter to the second focus setting includes causing actuation of a linear actuator of the focus control mechanism to move a lens in a direction that is perpendicular to an image plane of the image sensor.

29. The method of claim 17, wherein the one or more image capture settings include at least one of aperture size, temperature, lux, lens position, or region of interest.

30. The method of claim 17, further comprising:

receiving secondary image data captured by the image sensor according to the second focus setting; and outputting the secondary image data.

* * * * *